(12) United States Patent
Lund et al.

(10) Patent No.: US 10,710,670 B2
(45) Date of Patent: Jul. 14, 2020

(54) RIGID FRAME WITH HIGH-COMPLIANCE SEAT TUBE AND INTERNAL CABLE ROUTING

(71) Applicant: Trek Bicycle Corporation, Waterloo, WI (US)

(72) Inventors: Reggie Lund, Madison, WI (US); Steven Moechnig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 16/185,140

(22) Filed: Nov. 9, 2018

(65) Prior Publication Data

US 2019/0077484 A1   Mar. 14, 2019

Related U.S. Application Data

(62) Division of application No. 15/161,281, filed on May 22, 2016, now Pat. No. 10,150,530.

(Continued)

(51) Int. Cl.

| | |
|---|---|
| *B62K 23/02* | (2006.01) |
| *B62K 19/36* | (2006.01) |
| *B60T 11/04* | (2006.01) |
| *B62K 19/38* | (2006.01) |
| *B60T 7/08* | (2006.01) |

(Continued)

(52) U.S. Cl.
CPC ............... *B62K 23/02* (2013.01); *B60T 7/08* (2013.01); *B60T 11/046* (2013.01); *B62J 1/08* (2013.01); *B62K 19/36* (2013.01); *B62K 19/38* (2013.01); *B62K 19/48* (2013.01); *B62K 21/18* (2013.01); *B62L 3/02* (2013.01); *G05G 1/04* (2013.01); *B62J 11/13* (2020.02); *B62K 19/16* (2013.01); *B62K 19/30* (2013.01); *B62K 21/16* (2013.01); *F16C 1/226* (2013.01); *F16D 2125/60* (2013.01); *F16L 3/02* (2013.01)

(58) Field of Classification Search
CPC ... B62J 2099/0046; B62K 23/02; B62K 19/30
See application file for complete search history.

(56) References Cited

U.S. PATENT DOCUMENTS

| | | | |
|---|---|---|---|
| 4,768,798 A * | 9/1988 | Reed | B62J 6/18 280/281.1 |
| 6,983,949 B2 * | 1/2006 | Ueno | B62J 6/18 280/279 |

(Continued)

*Primary Examiner* — Jacob D Knutson
*Assistant Examiner* — Michael R Stabley
(74) *Attorney, Agent, or Firm* — Bell & Manning, LLC; Christopher L. Kalafut

(57) ABSTRACT

A bicycle can include a forward frame triangle that can include a top tube, a bottom tube, a bottom bracket, a structural seat tube, a compliant seat tube, and a pair of seat stays. The top tube can have a first end connected to a head tube and a second end. The bottom tube can have a first end connected to the head tube. The bottom bracket can be connected to the bottom tube. The structural seat tube can be connected to the bottom bracket and the top tube. The compliant seat tube can extend in an upward direction from the bottom bracket to the top tube and within the structural seat tube. The compliant seat tube can be coupled to the forward frame triangle such that the compliant seat post can bend within the structural seat tube.

10 Claims, 18 Drawing Sheets

Related U.S. Application Data

(60) Provisional application No. 62/164,926, filed on May 21, 2015.

(51) Int. Cl.
| | | |
|---|---|---|
| *B62J 1/08* | (2006.01) | |
| *B62K 19/48* | (2006.01) | |
| *B62K 21/18* | (2006.01) | |
| *B62L 3/02* | (2006.01) | |
| *G05G 1/04* | (2006.01) | |
| *B62K 19/16* | (2006.01) | |
| *B62K 19/30* | (2006.01) | |
| *B62K 21/16* | (2006.01) | |
| *F16C 1/22* | (2006.01) | |
| *F16D 125/60* | (2012.01) | |
| *B62J 11/13* | (2020.01) | |
| *F16L 3/02* | (2006.01) | |

(56) References Cited

U.S. PATENT DOCUMENTS

| | | | | |
|---|---|---|---|---|
| 7,093,844 | B2 * | 8/2006 | Horiuchi | B62K 19/32 280/279 |
| 7,114,738 | B1 * | 10/2006 | Chen | B62K 19/00 280/281.1 |
| 7,566,065 | B2 * | 7/2009 | Fukui | B62J 6/18 280/281.1 |
| 7,698,967 | B2 * | 4/2010 | Ording | B62K 21/125 74/551.8 |
| 7,891,687 | B2 * | 2/2011 | Schmider | B62K 19/30 280/281.1 |
| 9,056,646 | B1 * | 6/2015 | D'Aluisio | B62K 19/30 |
| 9,409,618 | B2 * | 8/2016 | Lanz | B62K 21/12 |
| 2005/0057017 | A1 * | 3/2005 | Hara | B62K 19/32 280/279 |
| 2013/0154234 | A1 * | 6/2013 | Shadwell | B62J 99/00 280/279 |
| 2015/0259022 | A1 * | 9/2015 | Nago | B62K 21/12 74/551.1 |
| 2015/0259023 | A1 * | 9/2015 | Nago | B62K 21/12 280/279 |

* cited by examiner

RIGID FRAME WITH HIGH-COMPLIANCE SEAT TUBE AND INTERNAL CABLE ROUTING

CROSS-REFERENCE TO RELATED PATENT APPLICATIONS

The present application is a divisional of U.S. patent application Ser. No. 15/161,281 that was filed May 22, 2016, the entire contents of which are hereby incorporated by reference; which claims priority to U.S. Provisional Application No. 62/164,926 that was filed May 21, 2015, the entire contents of which are hereby incorporated by reference.

BACKGROUND

The present invention relates to bicycles and, more particularly, to bicycle frames with improved compliance and improved cable routing. Riders may desire a rigid frame to maximize power transfer while still having compliance in their bicycles. Further, riders may desire internal cable routing to improve aerodynamics. Therefore, new and improved ways to provide compliance and route cables in bicycle frames are needed.

SUMMARY

The present disclosure provides a bicycle frame assembly having a structurally enclosed, deflectable seat tube that overcomes one or more of the aforementioned drawbacks. One aspect includes a bicycle frame assembly having an upper frame member and a lower frame member. The upper frame member can be connected to the lower frame member by a structural seat tube. The upper frame member can include a top tube and a pair of seat stays and extends between a dropout and a head tube in a generally continuous manner. The lower frame member can include a bottom tube, a bottom bracket, and a chain stay and can extend between the dropout and the head tube. A compliant seat tube can extend from the lower frame member toward the upper frame member through the structural seat tube and pass beyond the top tube. The compliant seat tube can be connected to the upper frame member by a pivot so that more of the compliant seat tube is located between the pivot and the bottom bracket than extends beyond the upper frame member. An opening can be formed through the top tube or a lug that connects the seat stays with the top tube proximate to the top of the structural seat tube. The compliant seat tube can pass through the opening in the upper frame member. Alternatively, the compliant seat tube could be perforated or otherwise contoured to pass generally around the more horizontal structure of the top tube and/or the seat stays. As another alternative, the seat tube could pass rearward relative to the top tube so as to be positioned in the space generally flanked by the seat stays.

Another aspect that is useable with one or more of the above aspects can be a bicycle frame assembly that includes a forward frame triangle that can include a top tube and a bottom tube connected by a structural seat tube. The top tube can include a first end that is connected to a head tube and a second end. The bottom tube can include a first end that is connected to the head tube and a second end. A bottom bracket can be connected to the second end of the bottom tube. A compliant seat tube can extend in an upward direction from the bottom bracket and a pair of seat stays can be connected to the top tube and extend in a rearward direction beyond the forward frame triangle. A pivot can connect the compliant seat tube to the forward frame triangle proximate the top tube at a location nearer a bicycle seat than the bottom bracket. The pivot allows that portion of the compliant seat tube disposed between the pivot and the bottom bracket to adjustably deflect from an at rest position during vertical loading of the compliant seat tube.

Another aspect that is useable with one or more of the above aspects includes a bicycle frame assembly having an upper frame member that can include a top tube and a pair of seat stays. The upper frame member can extend between a dropout associated with a rear wheel and a head tube. An opening can be formed in the upper frame member. A lower frame member can include a bottom tube, a bottom bracket, and a chain stay can extend between the dropout and the head tube. A seat tube can extend from the lower frame member toward the upper frame member and can pass through the opening in the upper frame member. The seat tube can be enclosed by a structural seat tube. A pivot can connect the compliant seat tube to the upper frame member proximate the opening so that more of the compliant seat tube is located between the pivot and the bottom bracket than extends beyond the upper frame member.

Another aspect that is useable with one or more of the above aspects includes a method of allowing deflection of a compliant seat tube while maintaining the rigidity of the frame triangle. A compliant seat tube is connected to a bottom bracket. The compliant seat tube is connected to an upper frame member with a pivot that is located at an overlapping intersection of the compliant seat tube and the upper frame member so that the compliant seat tube can deflect from alignment along a line between the bottom bracket and the pivot.

In another illustrative embodiment, a bicycle can include a forward frame triangle that can include a top tube, a bottom tube, a bottom bracket, a structural seat tube, a compliant seat tube, and a pair of seat stays. The top tube can have a first end connected to a head tube and a second end. The bottom tube can have a first end connected to the head tube. The bottom bracket can be connected to the bottom tube. The structural seat tube can be connected to the bottom bracket and the top tube. The compliant seat tube can extend in an upward direction from the bottom bracket to the top tube and within the structural seat tube. The compliant seat tube can be coupled to the forward frame triangle such that the compliant seat post can bend within the structural seat tube.

In another illustrative embodiment, a bicycle can include a frame, a fork, handlebars, at least one spacer, and an internal cable. The frame can include a top tube and a head tube. The fork can include a steer tube. The steer tube can comprise at least one routing feature selected from a flat face and a cable tray. The internal cable can be routed at least partially inside the handlebars to the steer tube. The internal cable can be routed between the routing feature of the steer tube and the spacer.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

Figure 1:
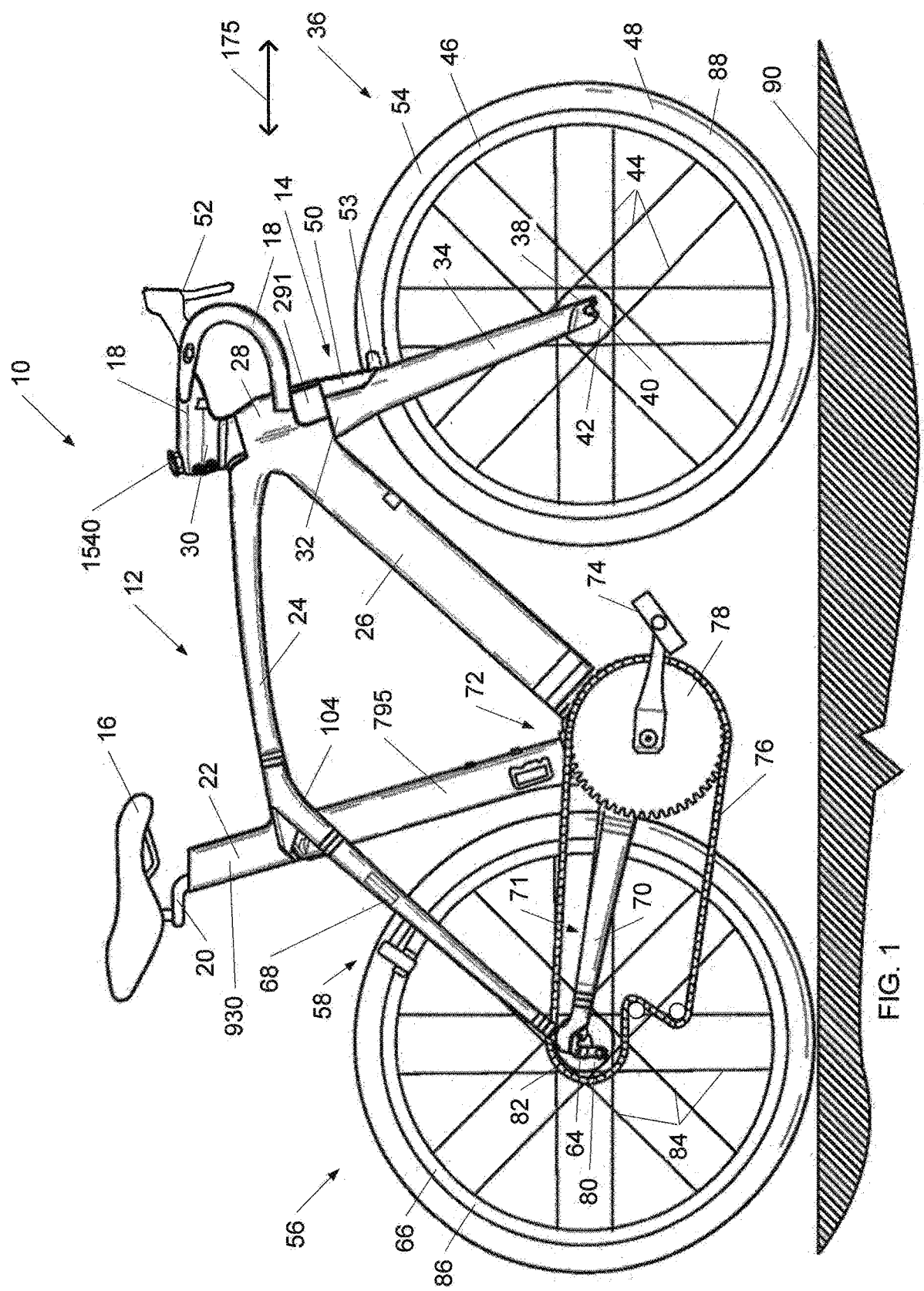
FIG. 1 is a side view of a bicycle 10 in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 2:
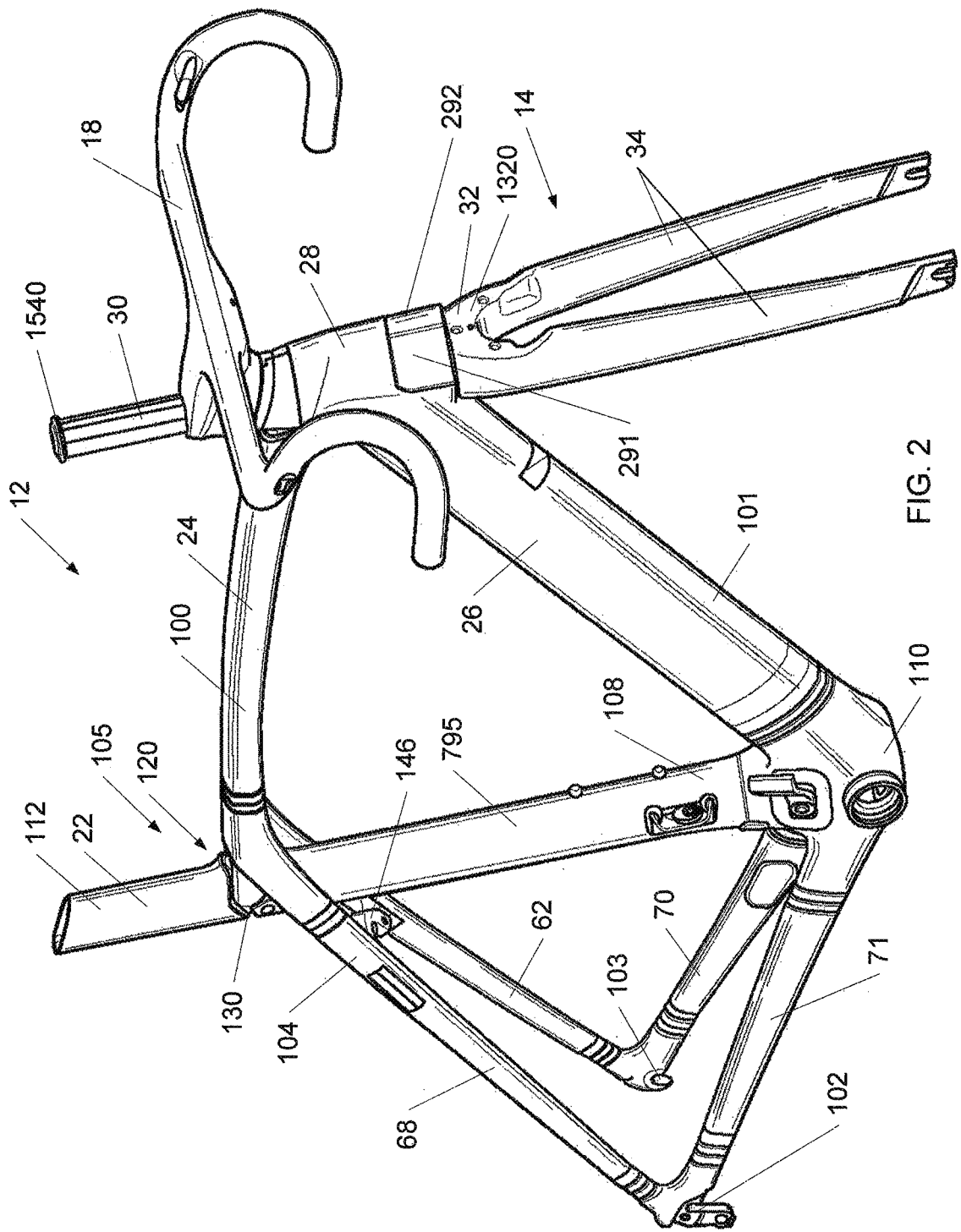
FIG. 2 is a perspective view of a frame assembly 12 of the bicycle 10 of FIG. 1 in accordance with an illustrative embodiment.
Figure 3:
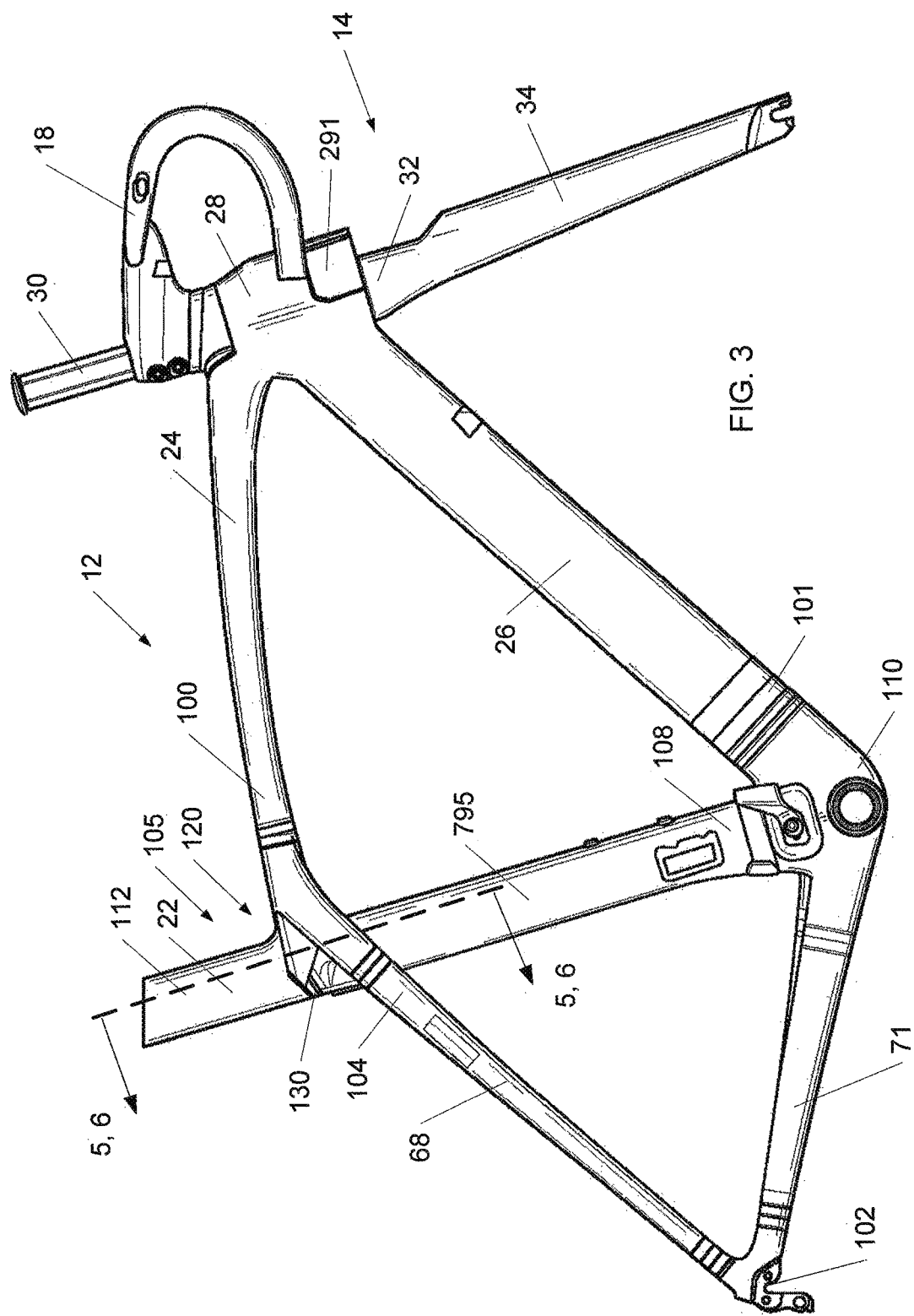
FIG. 3 is a side view of the frame assembly 12 of the bicycle 10 of FIG. 1 in accordance with an illustrative embodiment.
Figure 4:
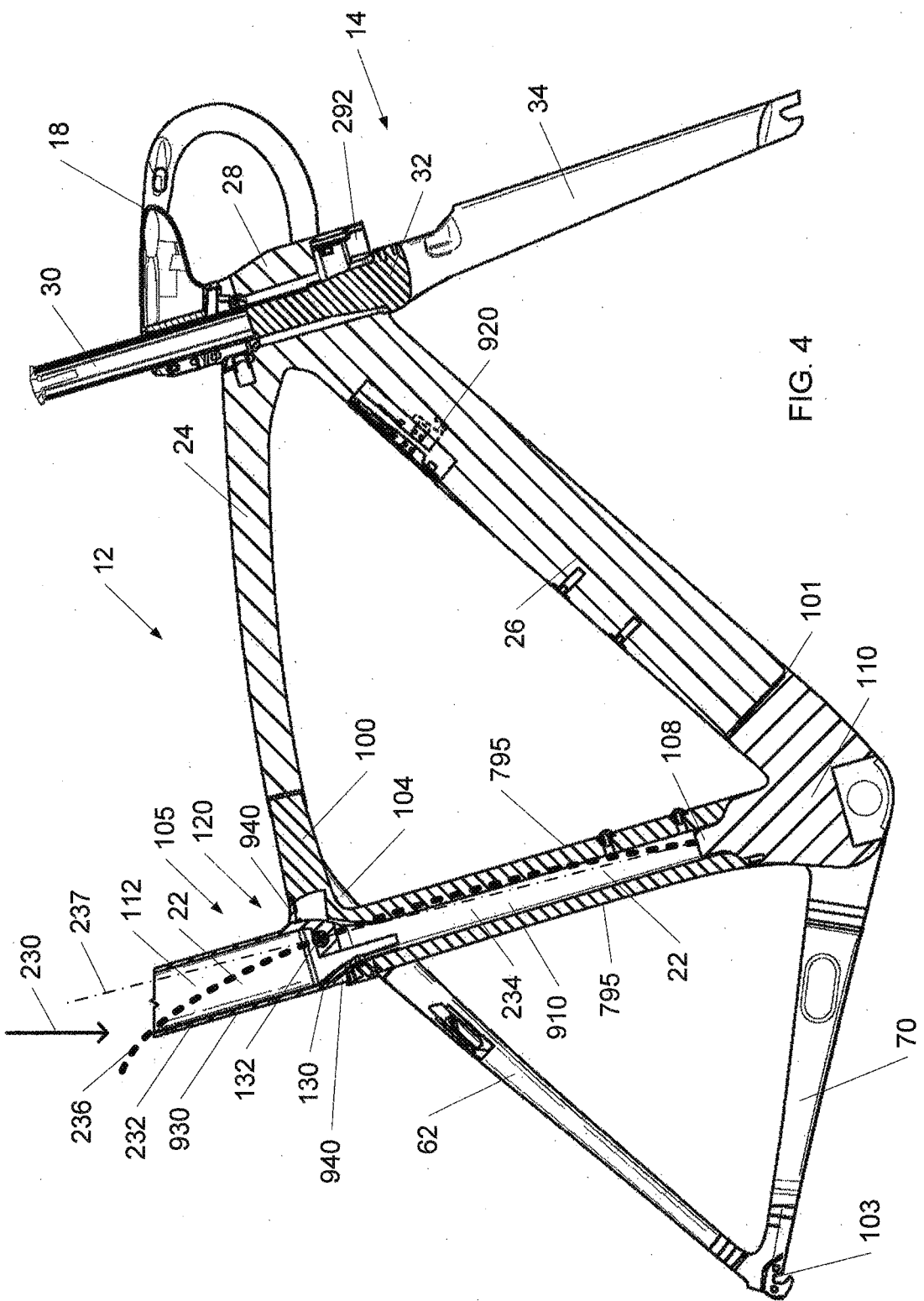
FIG. 4 is a side section view of the frame assembly 12 of the bicycle 10 of FIG. 1 in accordance with an illustrative embodiment.
Figure 5:
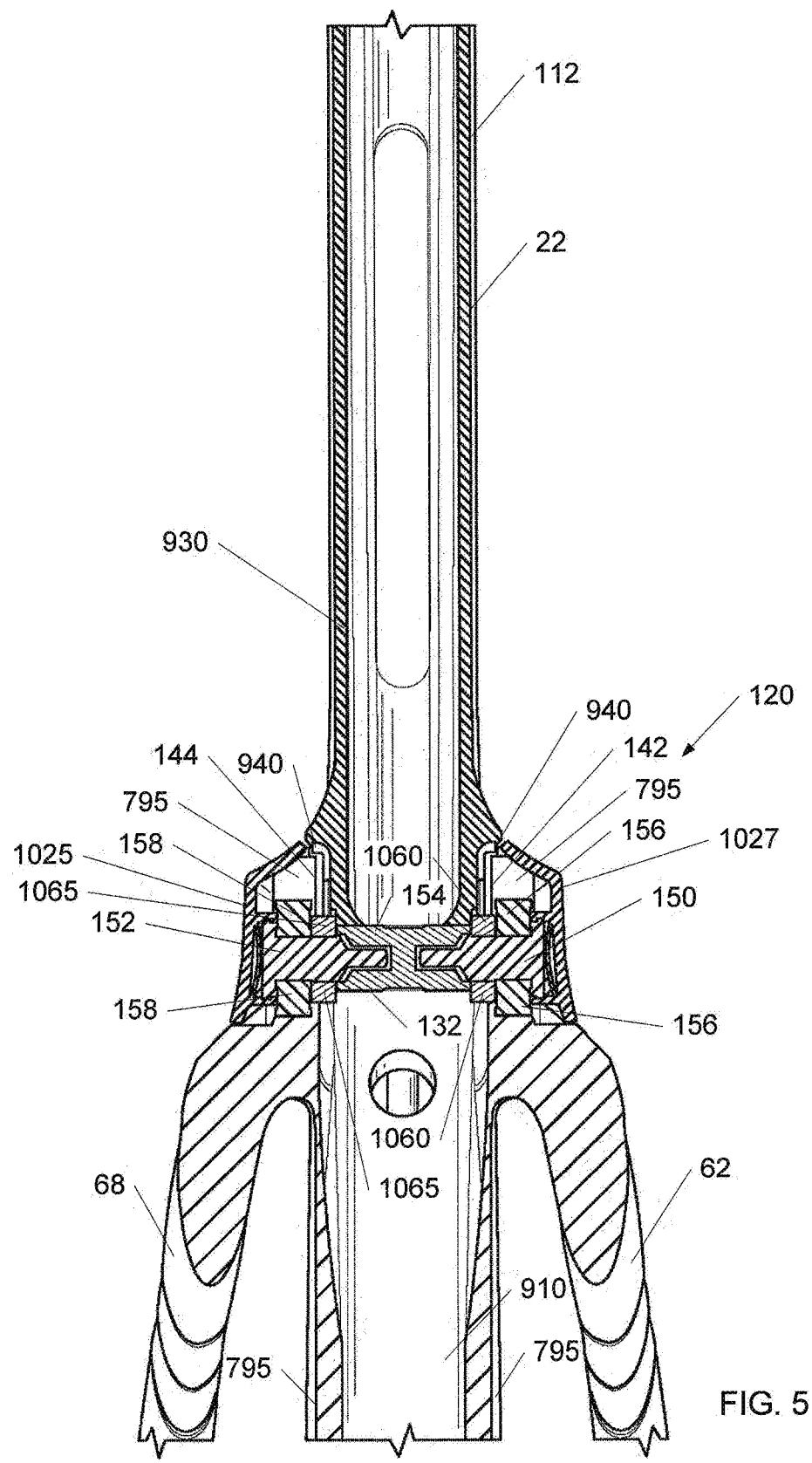
FIG. 5 is a front section view Section 5-5 of the frame assembly 12 of the bicycle 10 of FIG. 1 in accordance with an illustrative embodiment.
Figure 6:
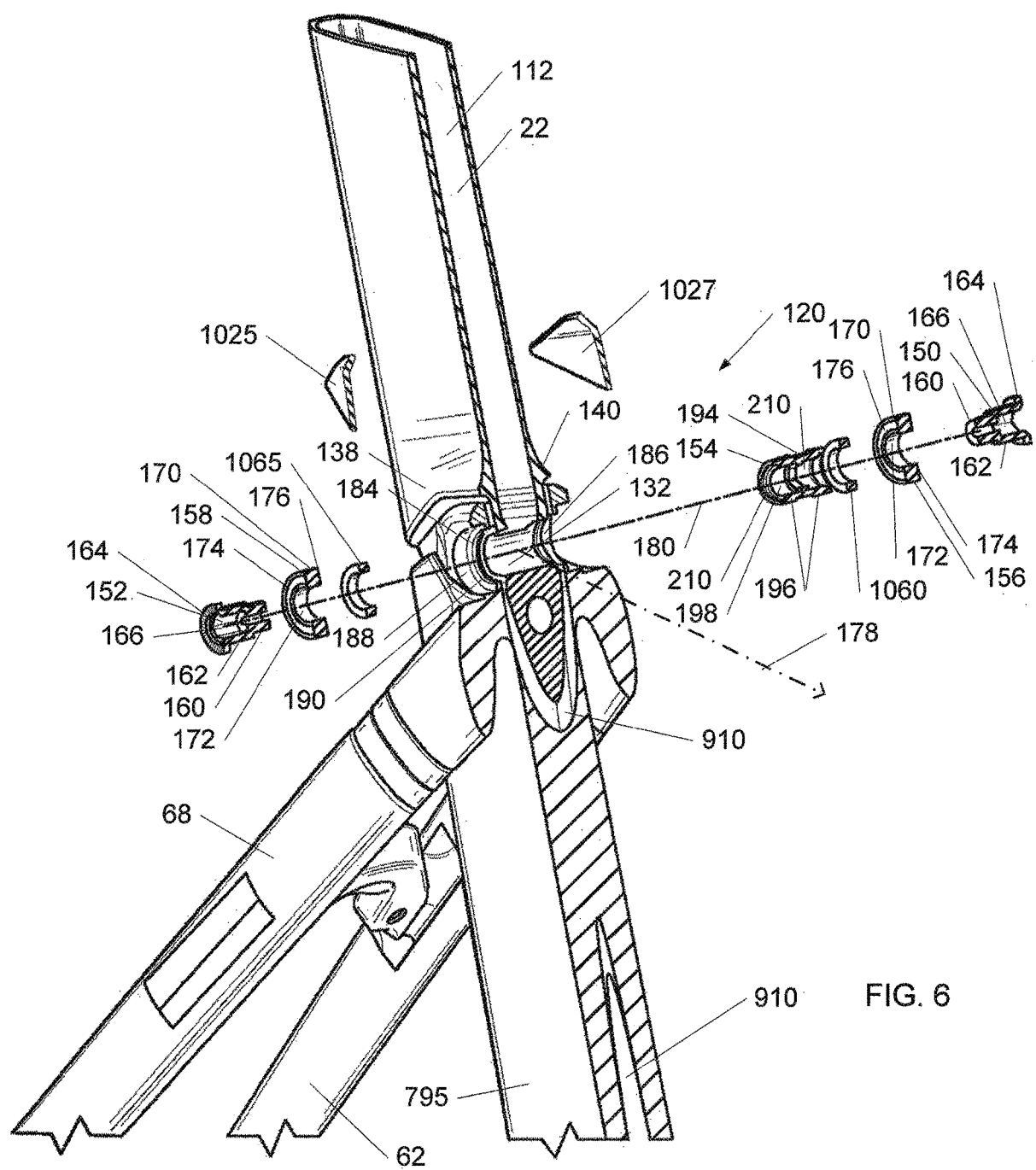
FIG. 6 is a perspective section view Section 5-5 of the frame assembly 12 of the bicycle 10 of FIG. 1 in accordance with an illustrative embodiment.
Figure 7:
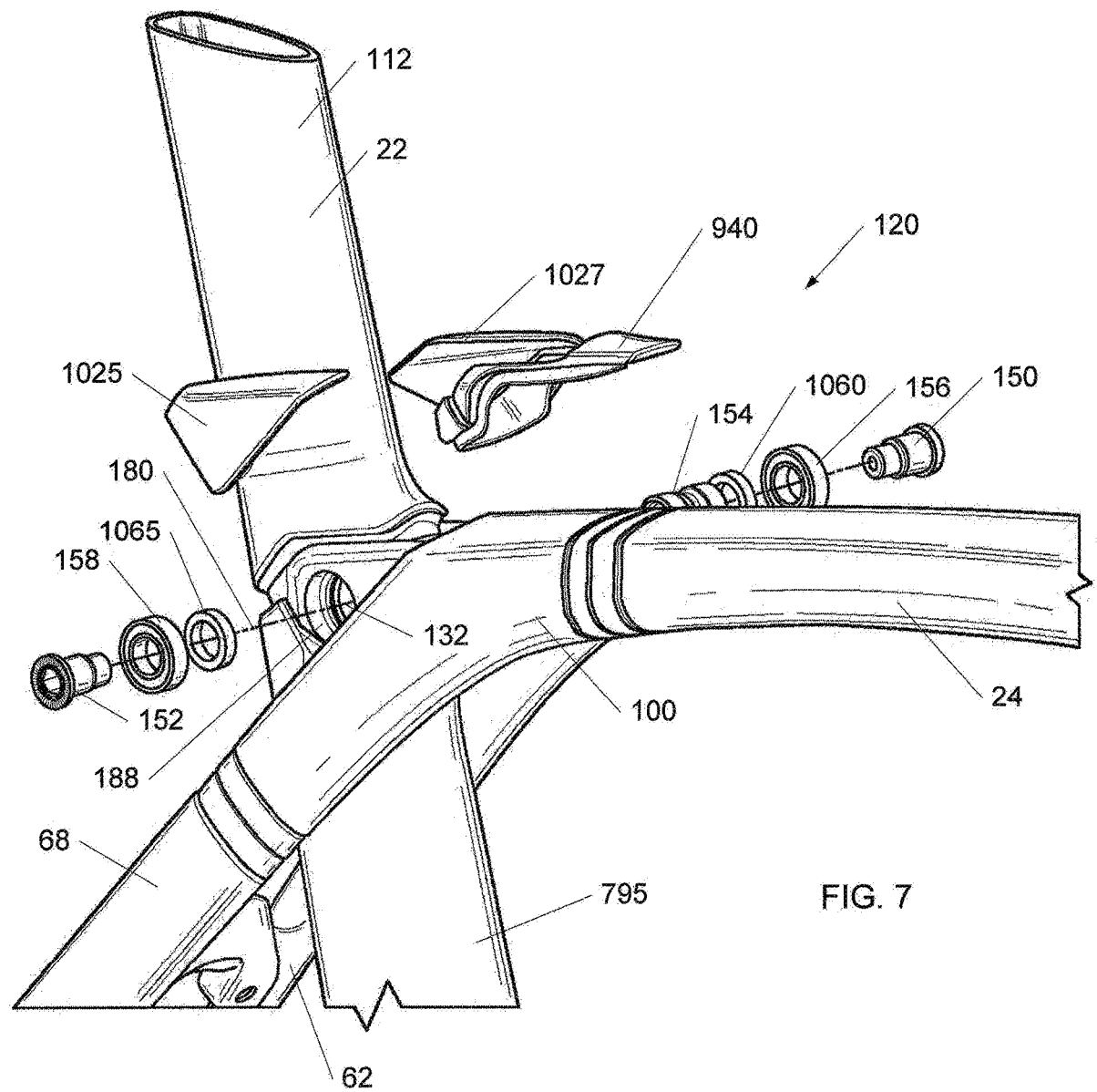
FIG. 7 is a perspective assembly view of the frame assembly 12 of the bicycle 10 of FIG. 1 in accordance with an illustrative embodiment.
Figure 8:
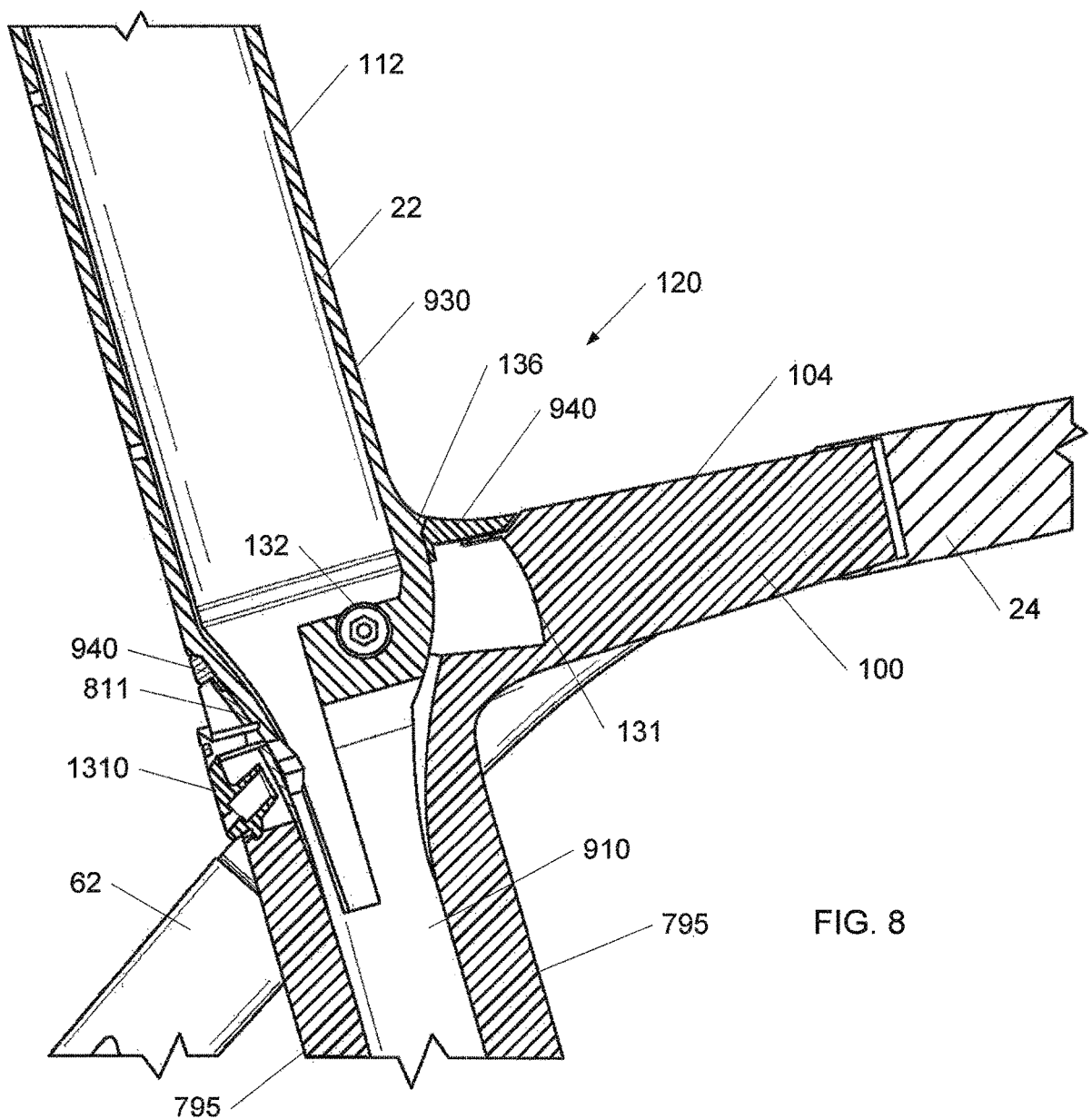
FIG. 8 shows a side section view of the frame assembly 12 of the bicycle 10 of FIG. 1 in accordance with an illustrative embodiment.
Figure 9:
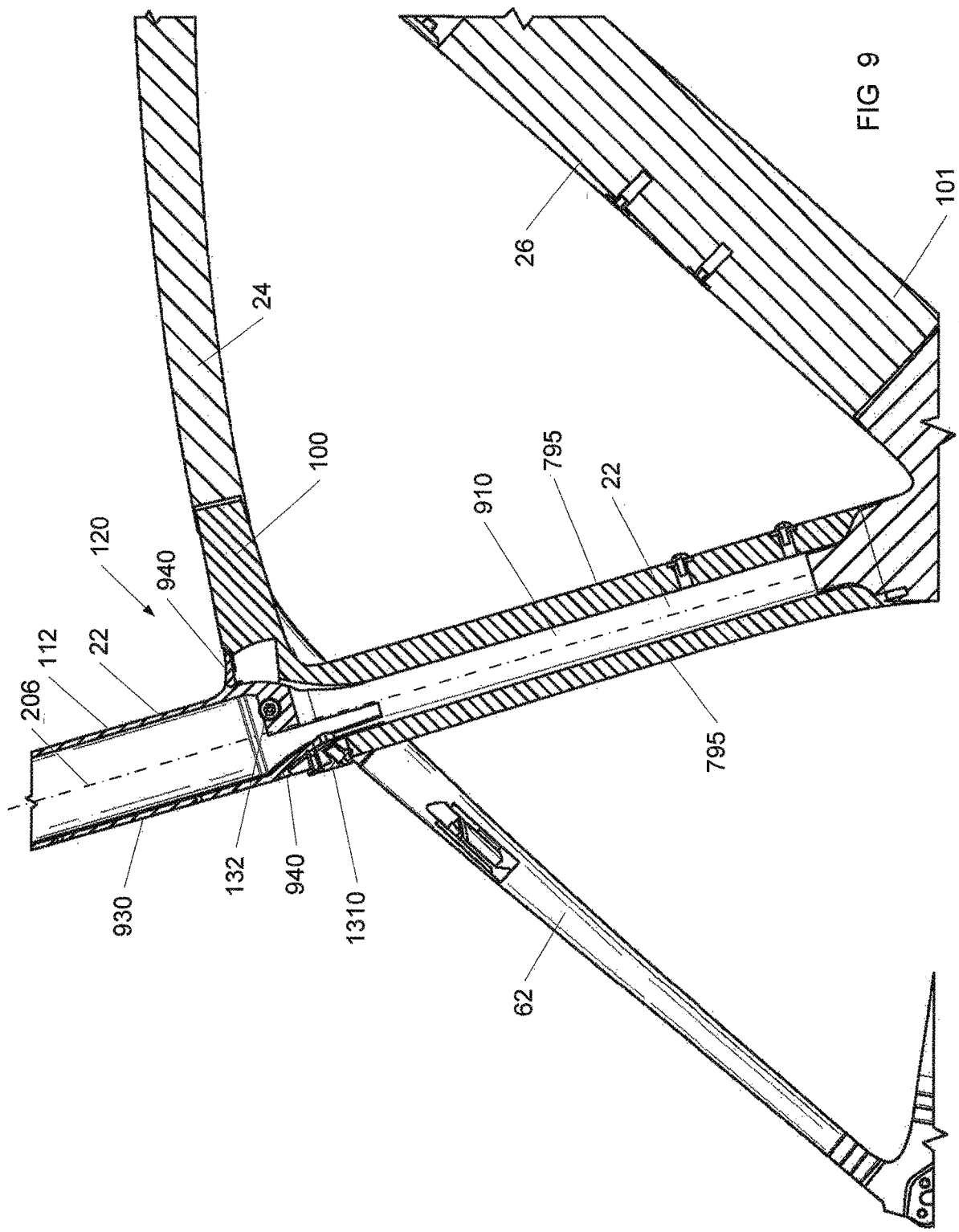
FIG. 9 shows a side section view of the frame assembly 12 of the bicycle 10 of FIG. 1 in accordance with an illustrative embodiment.

FIG. 1 shows a side view of a bicycle 10 in accordance with an illustrative embodiment. FIG. 2 shows a perspective view of a frame assembly 12 of the bicycle 10 of FIG. 1 in accordance with an illustrative embodiment. FIG. 3 shows a side view of the frame assembly 12 of the bicycle 10 of FIG. 1 in accordance with an illustrative embodiment. FIG. 4 shows a side section view of the frame assembly 12 of the bicycle 10 of FIG. 1 in accordance with an illustrative embodiment. (The section hatching of elements 795, 24, 26, and 14 is for the purposes of showing contrast) FIG. 5 shows a front section view Section 5-5 of the frame assembly 12 of the bicycle 10 of FIG. 1 in accordance with an illustrative embodiment. (The section hatching of elements 795, 62 and 68 is for the purposes of showing contrast) FIG. 6 shows a perspective section view Section 6-6 of the frame assembly 12 of the bicycle 10 of FIG. 1 in accordance with an illustrative embodiment. (The section hatching of elements 795, 62 and 68 is for the purposes of showing contrast) FIG. 7 shows a perspective assembly view of the frame assembly 12 of the bicycle 10 of FIG. 1 in accordance with an illustrative embodiment. FIG. 8 shows a side section view of the frame assembly 12 of the bicycle 10 of FIG. 1 in accordance with an illustrative embodiment. (The section hatching of elements 795, 62 and 68 is for the purposes of showing contrast) FIG. 9 shows a side section view of the frame assembly 12 of the bicycle 10 of FIG. 1 in accordance with an illustrative embodiment. (The section hatching of elements 795, 62 and 68 is for the purposes of showing contrast).

Bicycle 10 can include the frame assembly 12. Bicycle 10 includes a seat 16 and handlebars 18 that are attached to frame assembly 12. A seat post 20 can be connected to seat 16 and slidably engages a compliant seat tube 22 of frame assembly 12. A top tube 24 and a down tube (bottom tube) 26 extend forwardly from compliant seat tube 22 to a head tube 28 of frame 712. The top tube 24 and the down tube 26 can be connected by a structural seat tube 795. At least a portion of the seat tube 22 can be located within the structural seat tube 795. The structural seat tube 795 can have various cross-sections; for example, the structural seat tube 795 can have a round, oblong, elliptical or airfoil cross-section. Handlebars 18 can be connected to a stem or steer tube 30 that passes through head tube 28 and is connected or integrally formed with a fork crown 32. Handlebar 18 may include a stem that is constructed to slidably engage an interior cavity of steer tube 30. It is appreciated that one or more of the structures of bicycle 10 and frame assembly 12 can be constructed from similar materials, a variety of different materials, and various combinations thereof, such as steel, titanium, aluminum, and fiber reinforced plastic. Frame assembly 12 and compliant seat tube 22 can be formed of metal-type materials, such as aluminum-type materials, carbon fiber materials, and/or any other materials that are sufficiently formable and robust enough to support the rider of bicycle 10.

Fork assembly 14 can include a pair of fork blades or fork legs 34 that extend from generally opposite ends of fork crown 32 and are constructed to support a front wheel assembly 36 at an end thereof or dropout 38. Dropouts 38 engage generally opposite sides of an axle 40 constructed to engage a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48. Fork assembly 14 can be secured to the head tube 28 at least in part by steer cap 1540.

Bicycle 10 includes a front brake assembly 50 having an actuator 52 attached to handlebars 18 and a pair of brake pads 53 positioned on generally opposite sides of front wheel assembly 36. The shape of brake assembly 50 can be blended into or nested into the shape of fork assembly 14. Brake pads 53 can be constructed to engage a brake wall 54 of rim 46 thereby providing a stopping or slowing force to front wheel assembly 36. Head tube 28 can include brake doors 291 and 292. The brake doors 291 and 29 can be opened when brake assembly 50 is rotated from side to side. A rear wheel assembly 56 includes a brake assembly 58 similar to front wheel brake assembly 50 but it is appreciated that one or both of front and rear wheel brake assemblies 50, 58 could be provided in other brake configurations such as a disk brake assembly wherein a rotor and a caliper are positioned proximate one or more of front wheel axle 40 or a rear axle 64, respectively. A rear wheel 66 is positioned generally concentrically about rear axle 64.

A pair of seat stays 62, 68 (FIG. 2) and a pair of chain stays 70, 71 (FIG. 2) extend rearward relative to compliant seat tube 22 and offset rear axle 64 from a crankset 72. Crankset 72 includes a set of pedals 74 that is operationally connected to a flexible drive member such as a chain 76 via one or more variable diameter chain gears or a chain ring or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Fork assembly 14 is constructed to support a forward end 88 of bicycle 10 above a ground surface 90. Handlebar 18 is connected to frame 712 and fork assembly 14 such that operator manipulation of handlebar 18 is communicated to fork assembly 14 to facilitate rotation of front wheel assembly 36 relative to frame assembly 12 along a longitudinal axis, indicated by arrow 175, of bicycle 10. A longitudinal plane in the direction of arrow 175 can divide the bicycle 10 into a right-side and a left side from the perspective of a rider sitting on saddle 16 and facing forward end 88. As is commonly understood, such manipulation of handlebar 18 steers bicycle 10 during riding.

The construction of bicycle 10 shown in FIG. 1 is merely exemplary of a number of bicycle configurations. That is, whereas bicycle 10 is shown as what is commonly understood as a street or road bike, it is appreciated that the present invention is applicable to a number of bicycle configurations including those bicycles with more aggressive suspension systems commonly found in off-road or mountain bike frame configurations, and/or hybrids, crossover or multi-purpose bicycle frame configurations.

The top tube 24 and seat stays 68 can extend in a fairly continuous manner to form an upper frame member 100 that can extend from head tube 28 to a pair of dropouts 102, 103 that support rear axle 64. Upper frame member 100 can be formed as one piece and/or assembled from a distinct top tube 24, seat stays 68, and/or an optional lug 104 that is disposed between the top tube 24 and the seat stays 68. It is appreciated that seat stays 62, 68 and top tube 24 of upper frame member 100 could be formed as a unitary structure, a number of discrete permanently connected elements, or connected to one another via an optional lug 104 associated with an overlap area 105 of compliant seat tube 22 and upper frame member 100. In a similar manner, it is also appreciated that down tube 26, bottom bracket 110, and chain stays 70, 71, whose assemblies collectively define a lower frame member that extends from head tube 28 to one or more dropouts 102, 103 could be formed as a unitary assembly wherein bottom bracket 110 is formed with down tube 26 or chain stays 70, 71, or an assembly wherein the chain stays 70, 71 and down tube 26 can be permanently affixed to a discrete bottom bracket lug or simply bottom bracket 110. Once assembled, as shown in FIG. 1, bicycle 10 includes a forward frame triangle that is a generally defined by the triangular shape of the direction of extension of the structural seat tube, the top tube, and the down tube of frame assembly 12 regardless of the methodology or number of discrete elements used to form the frame assembly.

In one illustrative embodiment, compliant seat tube 22 includes a first end 108 that is secured (e.g., bonded) to bottom bracket 110 of bicycle frame 12 and a second end 112 that extends in a generally upward direction beyond the location of the lug or overlap area 105 with upper frame member 100. Seat post 20 (FIG. 1) can telescopically cooperate with compliant seat tube 22 of frame assembly 12. A passive pivot assembly 120 can connect an upper portion of compliant seat tube 22 to bicycle frame assembly 12 proximate overlap area 105 such that more of compliant seat tube 22 extends between pivot assembly 120 and bottom bracket 110 than extends in an upward direction relative to the intersection of compliant seat tube 22 and upper frame member 100. In an alternative embodiment, a flexible mechanical coupling can connect an upper portion of compliant seat tube 22 to bicycle frame assembly 12 proximate overlap area 105; for example, a thick gasket can support the compliant seat tube 22 in the upper frame member 100. In another example, flexible living hinge(s) or flexible member can connect the compliant seat tube 22 to the upper frame member 100.

The compliant seat tube 22 can include an upper portion 930 and a lower portion 910. The upper portion 930 can be located above the opening 132 and the lower portion 910 can be located below the opening 132. As noted above, the top tube 24 and the down tube 26 can be connected by a structural seat tube 795. The structural seat tube 795 can extend from the bottom bracket 110 to the upper frame member 100. In one embodiment, the structural seat tube 795 can enclose the lower portion 910 of the compliant seat tube 22. In one embodiment, the upper portion 930 can have a cross section that matches or blends with a cross section of the structural seat tube 795. The cross section of the upper portion 930 can be larger than the cross section of the lower portion 910. Thus, the lower portion 910 of the compliant seat tube 22 can flex or bend within the structural seat tube 795. In another embodiment, the structural seat tube 795 can enclose the entire compliant seat tube 22. In another embodiment, the structural seat tube 795 can enclose a portion of the compliant seat tube 22. In another embodiment, the structural seat tube 795 can be located along the sides of the compliant seat tube 22. In another embodiment, the structural seat tube 795 can be located fore, aft, or both fore and aft of the compliant seat tube 22.

The frame 12 can also include a mounts 750 associated with the lower seat mast 795. A seat post or saddle can be mounted on the upper portion 930. The structural seat tube 795 can include a cable stop 1310 for the rear brake cable. Accessories such as the front derailleur and water bottle can be mounted to the structural seat tube 795.

Passive pivot assembly 120 can complete the linkage between upper frame member 100, which includes top tube 24 and the structures associated with seat stays 62, 68. A lower end of compliant seat tube 22 is secured to lower frame member 101, which includes the down tube 26 and bottom bracket 110 and preferably one of more chain stays 70, 71. As explained above, structural seat tube 795, top tube 24 and down tube 25 collectively generally define the forward triangle of frame assembly 12. Frame assembly 12 has a fairly robust and stable feel during use but is also constructed to provide impact dampening performance in a manner that does not allow changing of the relative connection points of any of the respective members of the forward frame triangle. As described further below, the non-bonded rigid yet pivotable connection of compliant seat tube 22 with upper frame member 100 allows deflection of compliant seat tube 22 in a vertical plane and in a direction along the longitudinal length of the compliant seat tube 22 so as to allow the frame assembly 12 to provide a limited degree of suspension performance or vertical compliance without altering the orientation of the connection points of any of the frame members relative to one another.

The overlap area 105 can include a passage 130 that is shaped to allow compliant seat tube 22 to pass therethrough. An opening 132 can be formed laterally through compliant seat tube 22 and shaped to rotationally cooperate with pivot assembly 120. As mentioned above, it is envisioned that compliant seat tube 22 merely pass over an axis or longitudinal area associated with one or more of the top tube, the seat stays, and/or a fabrication lug being formed therebetween. It is envisioned that the seat tube could be perforated or otherwise contoured to pass generally around the more horizontal structure of the top tube and/or the seat stays associated with upper frame member 100. As another alternative, the seat tube could pass rearward relative to the closed structure of top tube 24 so as to be positioned in the space generally flanked by the seat stays. Each configuration allows limited passive pivoting between seat stays 70, 71 and the adjacent structure of upper frame member 100 of bicycle frame assembly 12.

A first gasket 940 can be located between the upper portion 930 and the upper frame member 100. The passage 130 can be bounded on a forward side 131 by an end wall associated with top tube 24 or a portion of the respective frame lug 104. The first gasket 134 can be disposed between forward side 131 of overlap area 105 and top tube 24 and generally surrounds a forward side 136, and opposite lateral sides 138, 140 of compliant seat tube 22. The first gasket 940 can prevent moisture and/or dirt and/or debris from entering the pivot area associated with passage 130 and the passage of compliant seat tube 22 therethrough but does not otherwise interfere with the flexion of compliant seat tube 22 during use of bicycle 10 as described further below. Passage 130 can be bounded on opposite lateral sides by side walls 142, 144 of upper frame member 100. Passage 130 can also be bounded by rear wall 811 of structural seat tube 795. An optional rear web wall 146 can also complete the definition of passage 130 such that upper frame member 100 completely surrounds compliant seat tube 22 with web wall 146 extending laterally between seat stays 62, 68.

The pivot assembly 120 can include a first bolt or other fastener 150, a second bolt or other fastener 152, a guide sleeve 154, and first and second bearings or bushings 156, 158. Each of fasteners 150, 152 includes a threaded portion 160, a stem portion 162, and a head portion 164. The radial diameter of each fastener 150, 152 gradually increase from the respective threaded portion 160 to the stem portion 162 to the head portion 164. One or each of head portions 164 includes a drive surface 166 that is shaped to cooperate with a driving tool, such as a hex driver or the like for securing each of first and second fasteners 150, 152 relative to pivot assembly 120. Although shown as being formed on an interior radial surface of fasteners 150, 152, it is appreciated that driving surface 166 could have any number of shapes and/or be provided on a radial exterior surface of the corresponding fastener 150, 152. It is further appreciated that one of fasteners 150, 152 could formed integrally with sleeve 154 such that operation of one respective fastener secures pivot assembly 120 relative to bicycle frame assembly 12.

Each bushing 156, 158 includes an outer radial surface 170, an inner radial surface 172, an outboard lateral surface 174, and an inboard lateral surface 176. As used herein, the inboard and outboard lateral directions associated with surfaces 174, 176 of each bushing 156, 158 refers to the orientation of surfaces 170, 174 relative to a longitudinal vertical plane that contains longitudinal axis 175 of bicycle 10 and the relative position of the respective surfaces and/or structures relative to the same. For example, surfaces 176 of bushings 156, 158 are nearer a longitudinal axis, indicated by line 178, of upper frame member 100. Accordingly, surfaces 174 are further outboard and surfaces 176 are further inboard relative to one another and longitudinal axis 178 of upper frame member 100 along a longitudinal axis, indicated by line 180, of pivot assembly 120. As shown in FIG. 5, the longitudinal axis 180 of pivot assembly 120 is oriented in a crossing direction relative to, and is preferably normal to, longitudinal axis 178 of upper frame member 100.

A first opening 184 and the second opening 186 can be formed in each of the respective sidewalls 142, 144 of upper frame member 100 and centered along axis 180 of pivot assembly 120. A seat 188 extends circumferentially about at least one of openings 184, 186 in the lateral outboard facing surface of the respective sidewall 142, 144. Seat 188 is defined by a lip 190 that extends circumferentially about the corresponding opening 184, 186 and is shaped to cooperate with sleeve 154 and a corresponding bushing 156, 158.

Sleeve 154 includes a stem portion 194, the head portion 196, and an opening 198 formed therethrough. Sleeve 154 is constructed to slidably cooperate with openings 184, 186 in a direction aligned with axis 180. When assembled, head portion 196 of sleeve 154 sits in opening 132 of compliant seat tube 22. Opening 132 of compliant seat tube 22 circumferentially cooperates with stem portion 194 of sleeve 154 when the longitudinal axis of opening 132 is aligned axis 180 of pivot assembly 120. As explained further below, compliant seat tube 22 bends in a plane that is normal to the axis of opening 132 of compliant seat tube 22, indicated by line 180.

Threaded portions 160 of each fastener 150, 152 operatively cooperate with a threaded surface 210 formed on an inner radial surface of sleeve 154. Bearings 156, 158 can rotatably cooperate with stem portion 162 of each of fasteners 150, 152 and cooperate with seats 188 defined by upper frame member 100. The pivot assembly 120 can include a first cover 1025 and a second cover 1027 that cooperate with the laterally outboard directed sides of pivot assembly 120. The laterally inboard facing side of the first cover 1025 and the second cover 1027 can include an attachment mechanism that is shaped to snuggly cooperate with a radially outboard directed surface of head portion 164 of a respective fastener 150, 152. Preferably, upper frame member 100 includes a recess that is shaped to mimic the shape of the first cover 1025 and the second cover 1027 such that when assembled, the first cover 1025 and the second cover 1027 provides a generally smooth contour along the exterior surface of upper frame member 100 associated with pivot assembly 120.

When assembled, pivot assembly 120 provides a secure connection between upper frame member 100 and compliant seat tube 22 and, with structural seat tube 795, does so in a manner that prevents lateral, longitudinal, and vertical movement of compliant seat tube 22 at axis 180 relative to upper frame member 100 but allows rotation of compliant seat tube 22 about axis 180 associated with opening 132 which is collinear with pivot assembly 120 relative to upper frame member 100. Such a connection allows only flexion or flexing movement of seat tube 22 relative to the other structural members of bicycle frame assembly 12 during use of bicycle 10.

As mentioned above, other interactions between compliant seat tube 22 and frame assembly 12 are envisioned that allow similar deflection of the compliant seat tube 22. For instance, compliant seat tube 22 could include a passage like passage 130 or otherwise be contoured so that the seat tube passed around the top tube/seat stays/lug and/or such that the top tube/seat stays/lug pass through the seat tube. Still another alternative includes connecting the seat stays to the upper frame member or top tube at a location forward of the seat tube such that the seat tube would be positioned in an area generally flanked by the seat stays. Although an axis, indicated by line 180, of pivot assembly 120 is offset in an forward direction relative to the longitudinal axis 206 of compliant seat tube 22, is appreciated that axis 180 could be oriented to intersect axis 206 or offset in a rearward direction relative thereto so as to alter the deflection performance of compliant seat tube 22 and/or to better suit the preferences of a given rider or class of users.

In alternative embodiments, interchangeable stiffening rods, tubes, or inserts can be placed inside the compliant seat tube 22 along at least a portion of the length of the compliant seat tube 22. In another embodiment, preload on the passive pivot assembly 120 can be increased or decreased to change the compliance (or flexibility) of the compliant seat tube 22.

During normal use of frame assembly 12, compliant seat tube 22 maintains a generally "at rest" configuration as represented by compliant seat tube 22 shown in FIG. 4. In one embodiment, compliant seat tube 22 has a fairly linear at rest orientation. Understandably, during normal use, some initial deflection of compliant seat tube 22 may occur depending on the weight and preferred orientation of the rider during normal use over relatively smooth terrain. During an impact event, indicated by arrow 230, a downward and rearward bending moment is imparted to compliant seat tube 22 by the interaction of the rider with the rear portion of a saddle, which is commonly offset to the rear of the longitudinal centerline 206 of compliant seat tube 22. Such loading of the seat tube allows the compliant seat tube 22 to pivot in a passive manner about pivot assembly 120 and results in a rearward deflection of an upper portion 232 of compliant seat tube 22 positioned above pivot assembly 120 and a forward deflection of a lower portion 234 of compliant seat tube 22 that is positioned between pivot assembly 120 and bottom bracket 110 relative to the at-rest orientation.

The deflection of compliant seat tube 22 relative to upper frame member 100 and lower frame member 101 is shown graphically in FIG. 4 by line 236 relative to line 237. Line 237 shows an exemplary at rest centerline of compliant seat tube 22; and line 236 shows an exemplary deflection centerline line of compliant seat tube 22 under load. Such a configuration allows near the entirety of compliant seat tube 22 to deflect from an at rest position to a "bent" orientation, represented by line 236 to improve the vertical compliance of frame assembly 12 while structural seat tube 795 maintains rigidity between upper frame member 100 and bottom bracket 110. Supporting an upper end of compliant seat tube 22 proximate the intersection of compliant seat tube 22 with upper frame member 100 provides a fairly rigid feel of frame assembly 12 during all riding conditions but mitigates the communication of undampened travel surface discontinuities to the rider via rider interaction with the bicycle seat. Such performance improves rider comfort and decreases rider discomfort commonly associated with extended rides. In one embodiment, compliant seat tube 22 deflects no more than 15 degrees from an at rest orientation. In another embodiment, compliant seat tube 22 deflects no more than 7 degrees from a rest position in response to rider interaction with seat 16. Such a configuration has been shown to provide a desired degree of responsiveness to rider interaction with the bicycle frame and does so in a manner that improves the vertical compliance of the bicycle frame assembly without unduly detracting from the same. However, it is appreciated that any desired range of deflection can be provided. In one embodiment, the greatest deflection value is associated with a deflection that a rider will tolerate and still feel comfortable on the bicycle during most riding conditions to a near unperceivable deflection during most riding conditions.

As shown in the experimental data below, frame assembly 12 provides greater longitudinal deflection of the seat tube with comparable lateral stiffness for bicycle frames having similar shapes and with nearly negligible contribution to the overall weight of the bicycle frame assembly. It is further envisioned that the forward and/or rearward orientation of the pivot axis relative to the longitudinal axis of the seat tube can be manipulated to satisfy a wide variety of rider performance preferences and/or to alter the deflection performance of the seat tube. It is further appreciated that the construction of the seat tube can be manipulated to further alter the vertical compliance of the frame assembly while providing a robust bicycle frame assembly.

| Description | Size | Frame Sample # | Weight (gram) | Full Frame Torsional Stiffness (inches) | Head Tube Stiffness N * m per degree | BB horizontal deflection (2) inches | Vertical Compliance (inches) |
|---|---|---|---|---|---|---|---|
| 6SRS Baseline | 56 H3 | 2011-5428 | 850 | 0.1885 | 78 | 56 | 0.86 |
| 6SRS Pivot (Unadjustable) | 56 H3 | 2011-5697 | 898 | 0.186 | 79* | 54 | 1.38 |

As shown in the data provided above, configuring a bicycle frame with the passive pivot connection between the seat tube and the upper frame member provides improved vertical compliance of the seat tube of approximately 60% with an increase in frame assembly weight of approximately 48 grams or only approximate 5% of the overall weight of the frame assembly. Accordingly, bicycle frame assembly 12 provides a bicycle frame have acceptable frame responsiveness with improved vertical compliance for improving rider comfort.

Figure 10:
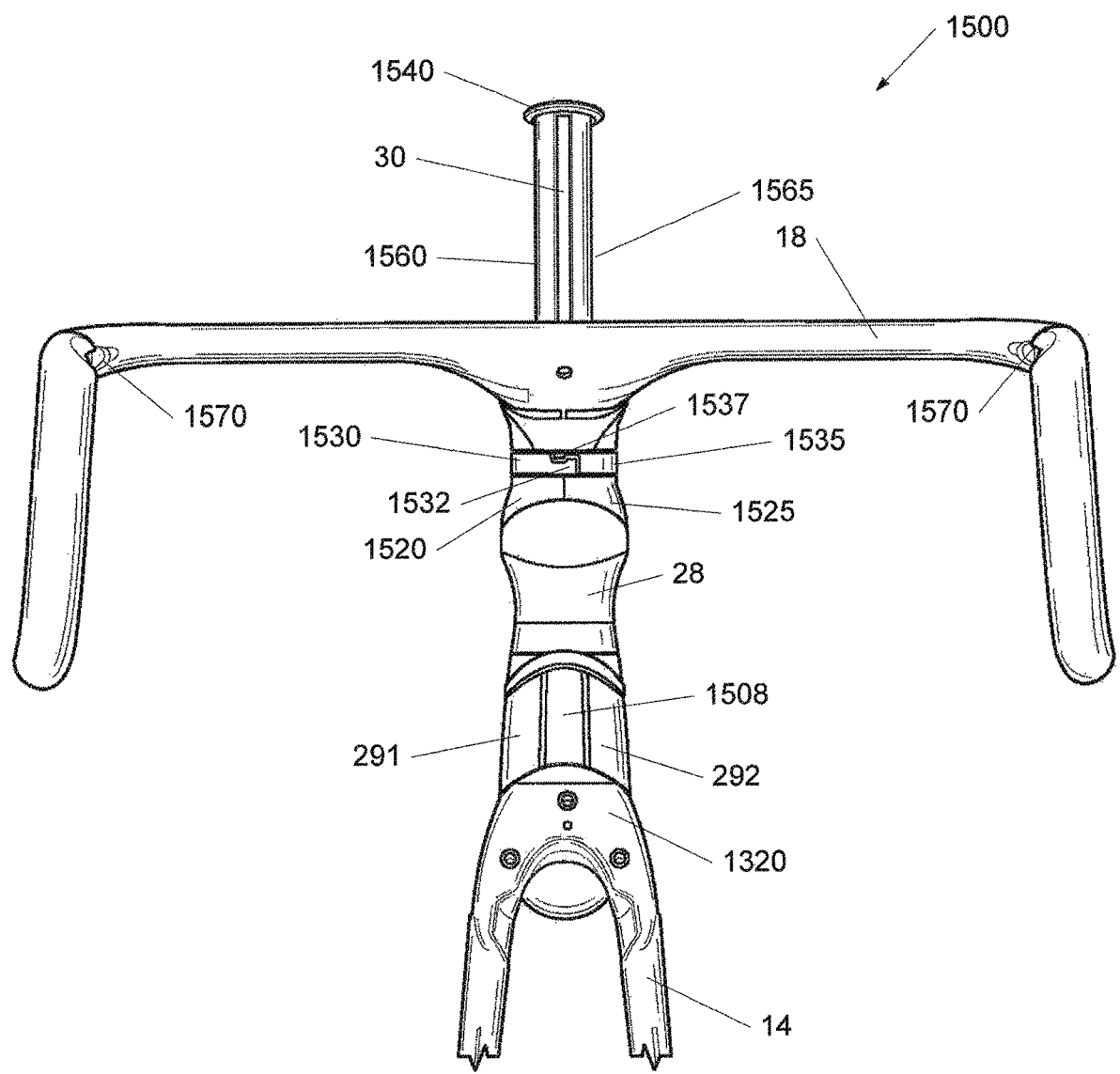
FIG. 10 is a front view of a handlebar assembly 1500 of the frame assembly 12 of the FIG. 1 in accordance with an illustrative embodiment.
Figure 11:
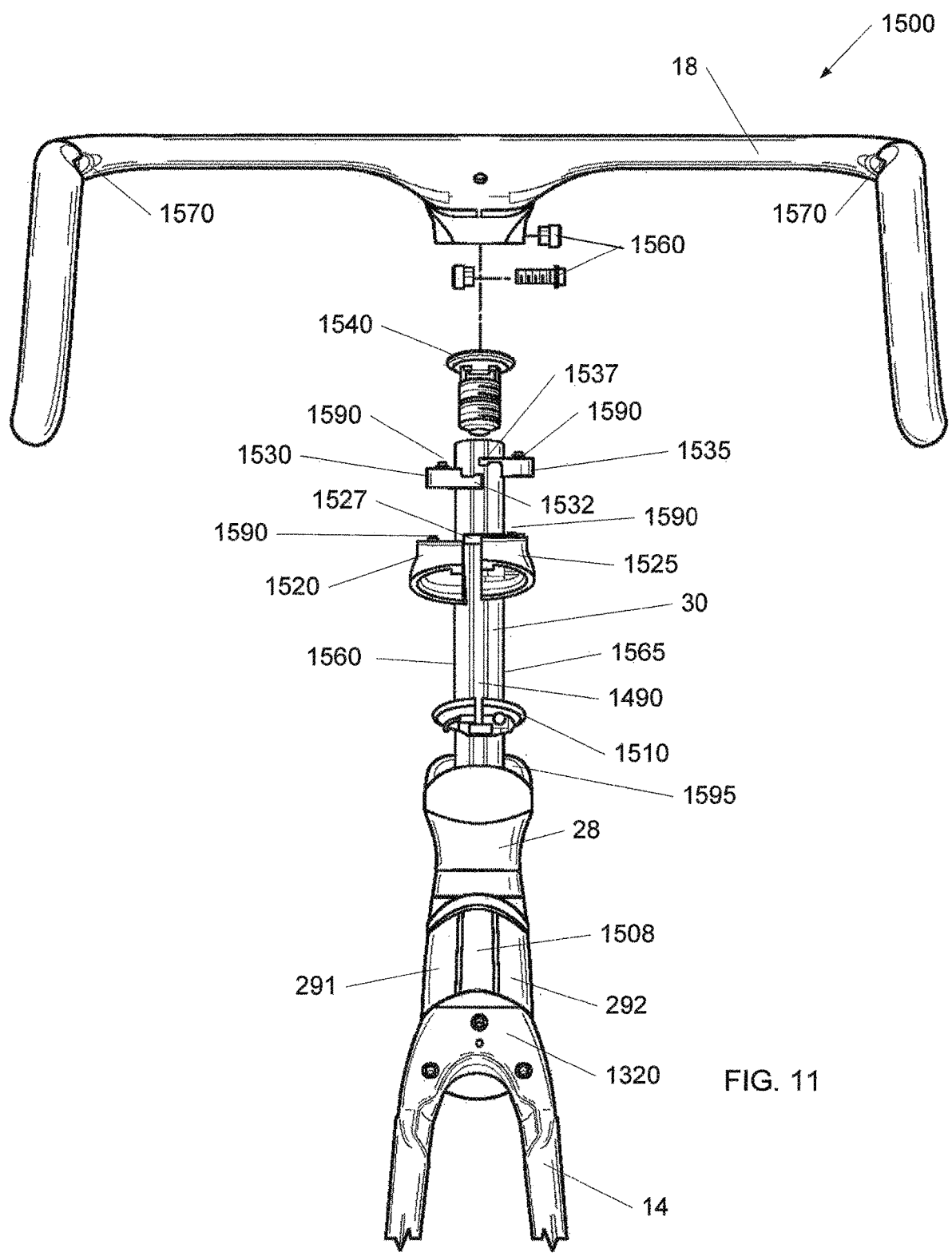
FIG. 11 is a front assembly view of the handlebar assembly 1500 of the frame assembly 12 of the FIG. 10 in accordance with an illustrative embodiment.
Figure 12:
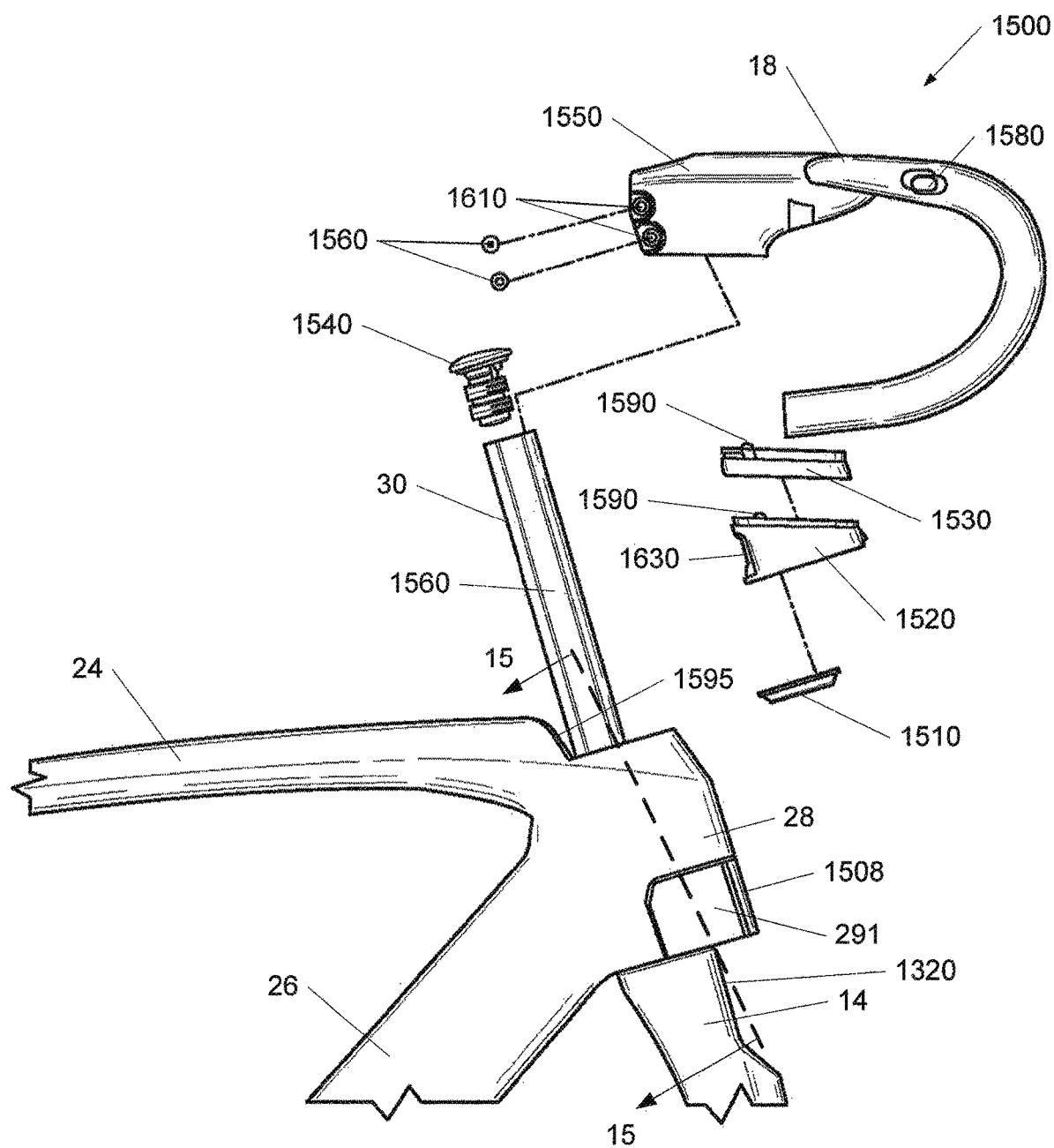
FIG. 12 is a side assembly view of the handlebar assembly 1500 of the frame assembly 12 of the FIG. 10 in accordance with an illustrative embodiment.
Figure 13:
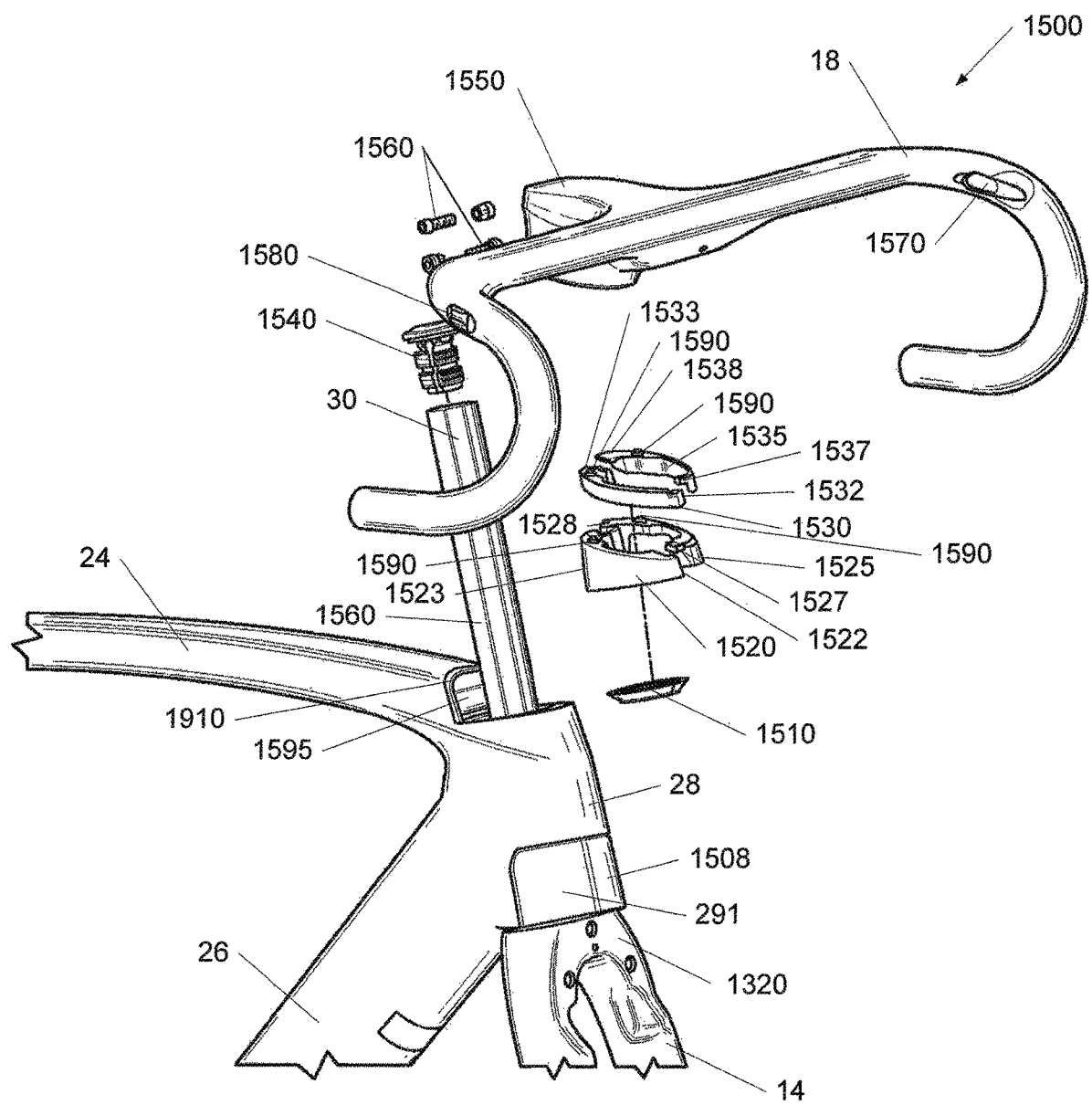
FIG. 13 is a perspective assembly view of the handlebar assembly 1500 of the frame assembly 12 of the FIG. 10 in accordance with an illustrative embodiment.
Figure 14:
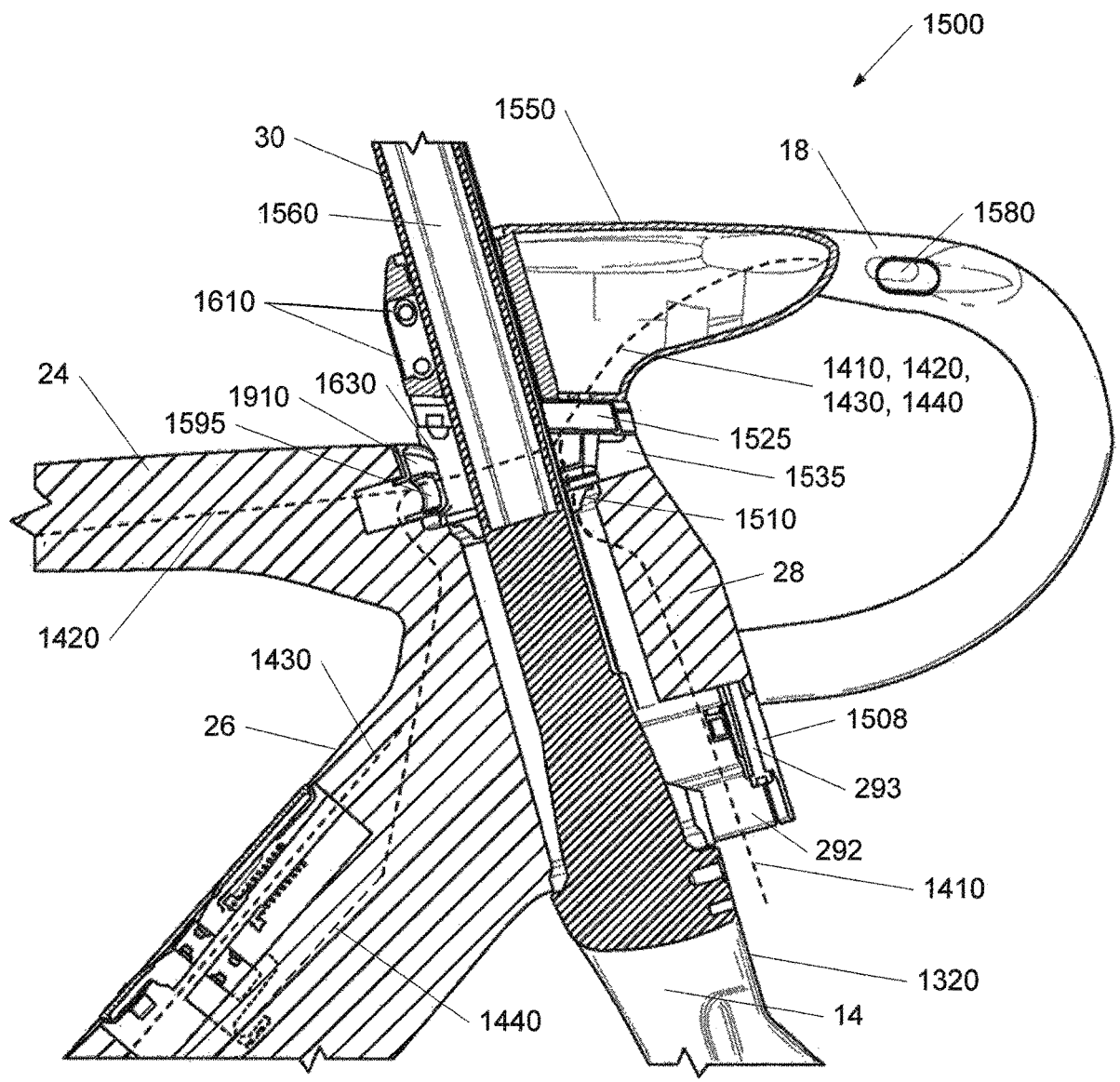
FIG. 14 is a side section view of the handlebar assembly 1500 of the frame assembly 12 of the FIG. 10 in accordance with an illustrative embodiment.
Figure 15:
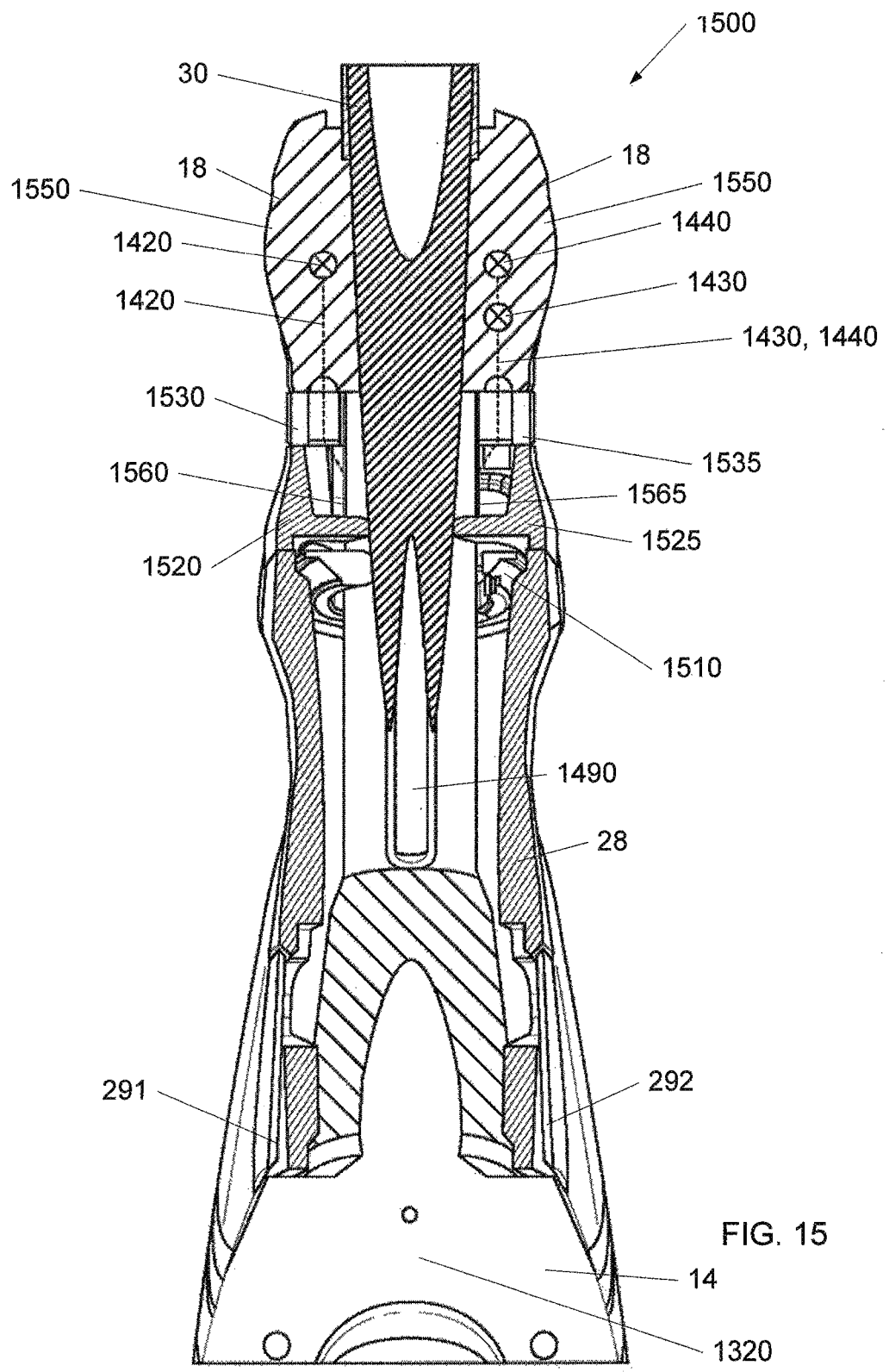
FIG. 15 is a front section view of the handlebar assembly 1500 of the frame assembly 12 of the FIG. 10 in accordance with an illustrative embodiment.

Referring now to FIG. 10, a front view of a handlebar assembly 1500 of the frame assembly 12 of the FIG. 1 in accordance with an illustrative embodiment is shown. Referring to FIG. 11, a front assembly view of the handlebar assembly 1500 of the frame assembly 12 of the FIG. 10 in accordance with an illustrative embodiment is shown. Referring to FIG. 12, a side assembly view of the handlebar assembly 1500 of the frame assembly 12 of the FIG. 10 in accordance with an illustrative embodiment is shown. Referring now to FIG. 13, a perspective assembly view of the handlebar assembly 1500 of the frame assembly 12 of the FIG. 10 in accordance with an illustrative embodiment is shown. Referring now to FIG. 14, a side section view of the handlebar assembly 1500 of the frame assembly 12 of the FIG. 10 in accordance with an illustrative embodiment is shown. (The section hatching of elements 24, 26, and 28 is for the purposes of showing contrast) Referring now to FIG. 15, a front section view Section 15-15 of the handlebar assembly 1500 of the frame assembly 12 of the FIG. 10 in accordance with an illustrative embodiment is shown.

The handlebar assembly 1500 can include handlebars 18, a right base spacer 1520, a left base spacer 1525, a right spacer 1530, a left spacer 1535, a brake cover 1508, a bushing 1510, and a steer cap 1540. The handlebars 18 can include a stem 1550 and openings 1570 and 1580. The handlebars 18, including stem 1550, can be generally hollow. The stem 1550 can be secured to the steer tube 30 by pinch bolts 1560. The steer tube 30 can include a right flat face 1560 and a left flat face 1565 located along the right and left sides of the steer tube 30, respectively. In an alternative embodiment, the stem and handlebars can be separate pieces.

The right base spacer 1520 can include a first connecting mechanism 1522 and a second connecting mechanism 1523. The left base spacer 1525 can include a first connecting mechanism 1527 and a second connecting mechanism 1528. The respective first connecting mechanisms 1522, 1527 and the respective second connecting mechanisms 1523, 1528 can be used to connect the right base spacer 1520 and the left base spacer 1525 together. In one embodiment, the first connecting mechanisms 1522, 1527 and the respective second connecting mechanisms 1523, 1528 can be hooks that mate. In another embodiment, fasteners can be used to connect the right base spacer 1520 and the left base spacer 1525 together. The right base spacer 1520 and the left base spacer 1525 can include alignment posts 1590. The right base spacer 1520 and the left base spacer 1525 can include a cable exit 1630. The right base spacer 1520 and the left base spacer 1525, when connected together around the steer tube 30, can true up the top of the right base spacer 1520 and the left base spacer 1525 to the top of the top tube 24 so that additional spacers can be added.

The right spacer 1530 can include a first connecting mechanism 1532 and a second connecting mechanism 1533. The left spacer 1535 can include a first connecting mechanism 1537 and a second connecting mechanism 1538. The respective first connecting mechanisms 1532, 1537 and the respective second connecting mechanisms 1533, 1538 can be used to connect the right spacer 1530 and the left spacer 1535 together. In one embodiment, the first connecting mechanisms 1532, 1537 and the respective second connecting mechanisms 1533, 1538 can be hooks that mate. In another embodiment, fasteners can be used to connect the right spacer 1530 and the left spacer 1535 together. The right spacer 1530 and the left spacer 1535 can include alignment posts 1590. The alignment posts 1590 can fix the stem 1550, the right spacer 1530, the left spacer 1535, the right base spacer 1520 and the left base spacer 1525 together so that they rotate around the steer tube 30 together.

The steer tube 30 passes through the head tube 28. The bushing 1510 can be placed on steer tube 30 and can sit on the top of the head tube 28. In one embodiment, the bushing 1510 can be place in a top headset bearing located proximate the top of the head tube 28. The right base spacer 1520 and the left base spacer 1525 can be placed around the steer tube 30 and connected. The right spacer 1530, the left spacer 1535 can be placed around the steer tube 30 and connected. The handlebars 18 can be placed around the steer tube 30 and the stem 1550 can be tightened around the steer tube 30 by pinch bolts 1560. The steer cap 1540 can be inserted into the steer tube 30. Additional spacer elements (e.g., 1530, 1535) can be added to adjust the height of handlebars 18. The steer tube 30 can be trimmed after sizing for the specific rider. The connecting mechanisms of the spacers enable a bike mechanic to easily change the number of spacer elements without breaking the cabling.

Cables 1410, 1420, 1430 and 1440 can be routed within the handlebar assembly 1500 and inside frame assembly 12. Cables 1410, 1420, 1430 and 1440 can be, for example, a traditional Bowden-type cable, i.e., a shielded cable. Cables 1410, 1420, 1430 and 1440 can be used to connect control levers and components such as brakes and derailleurs. The right base spacer 1520 and the left base spacer 1525 can include inboard openings or areas through which Cables 1410, 1420, 1430 and 1440 can pass. The right base spacer 1520 and the left base spacer 1525 can include inboard openings or areas through which cables 1410, 1420, 1430 and 1440 can pass. The bushing 1510 include inboard openings or areas through which cables 1410, 1420, 1430 and 1440 can pass.

In one embodiment, cables 1420, 1430 and 1440 can be routed through opening 1570 or opening 1580, inside handlebars 18, through stem 1550, through the right spacer 1530 or the left spacer 1535 and the right base spacer 1520 or the left base spacer 1525 while passing the right flat face 1560 or the left flat face 1565; out of the cable exit 1630, in the cable entry 1595 and into frame 12. Thus, the cable exit 1630 and the cable entry 1595 are in general alignment to allow the cables 1420, 1430 and 1440 to pass through. The cable entry 1595 can include a cable guide 1910. In addition, the width of the cable exit 1630 and the cable entry 1595 are sized to allow for turning of the fork assembly 14. Cables 1420, 1430 and 1440 can be routed, for example, to the rear brake, front derailleur, or rear derailleur. The cable entry 1595 can be located at a front, top of the top tube 24 and generally behind the right base spacer 1520 and the left base spacer 1525. Advantageously, the cables can be located within the frame 12 to reduce drag.

In another embodiment, a cable 1410 can be routed through opening 1570 or opening 1580, inside handlebars 18, through stem 1550, through the right spacer 1530 or the left spacer 1535 and the right base spacer 1520 and/or the left base spacer 1525 while passing against a front cable tray 1490 molded into the front of the steer tube 30; through the bushing 1510, and into the inside of the head tube 28. The bushing 1510 can have an opening through which cable 1410 passes. In one embodiment, cable 1410 can be coupled to the front brake assembly 50 which is attached to the fork assembly 14 at a brake mounting surface 1320. As a rider turns the fork assembly 14, the cable 1410 and a cable attachment portion of the front brake assembly 50 may need to sweep outside head tube 28. Head tube 28 can include a brake cover 1508 including brake doors 291 (right) and 292 (left). The brake doors 291 and 292 swing on hinges 293. The brake doors 291 and 292 can be opened by the brake assembly 50 when brake assembly 50 is rotated from side to side. The brake doors 291 and 292 can be opened to provide access to brake assembly 50 to attach or adjust cabling. Advantageously, the cables can be located within the frame 12 to reduce drag.

In alternative embodiments, cables 1420, 1430 and 1440 can be routed to other areas of the bike such as the tips of fork blades or next to shocks. In alternative embodiments, cables 1420, 1430 and 1440 can be hydraulic lines.

Figure 16:
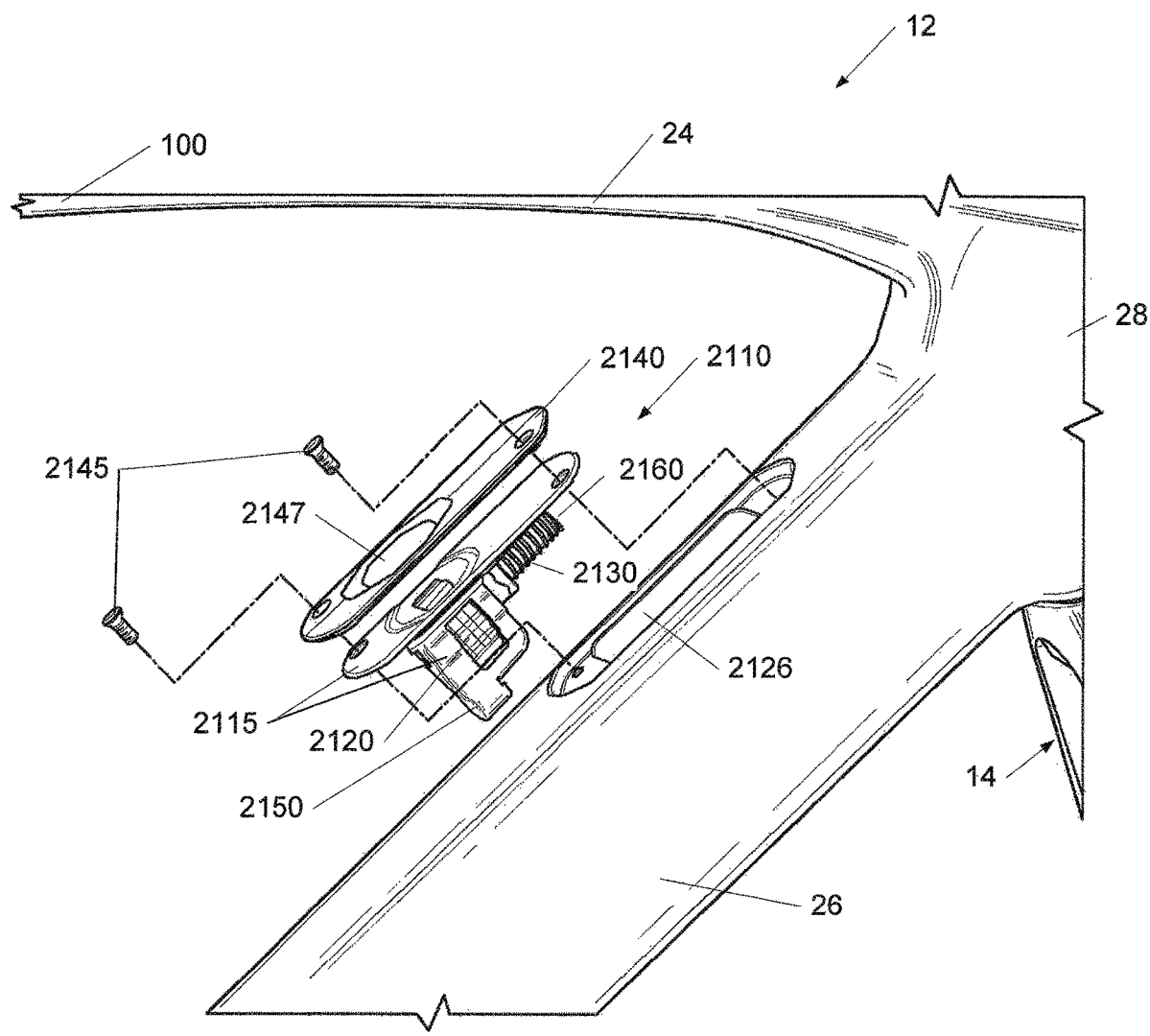
FIG. 16 is a perspective view of the down tube 26 of the frame assembly 12 of FIG. 1 in accordance with an illustrative embodiment.
Figure 17:
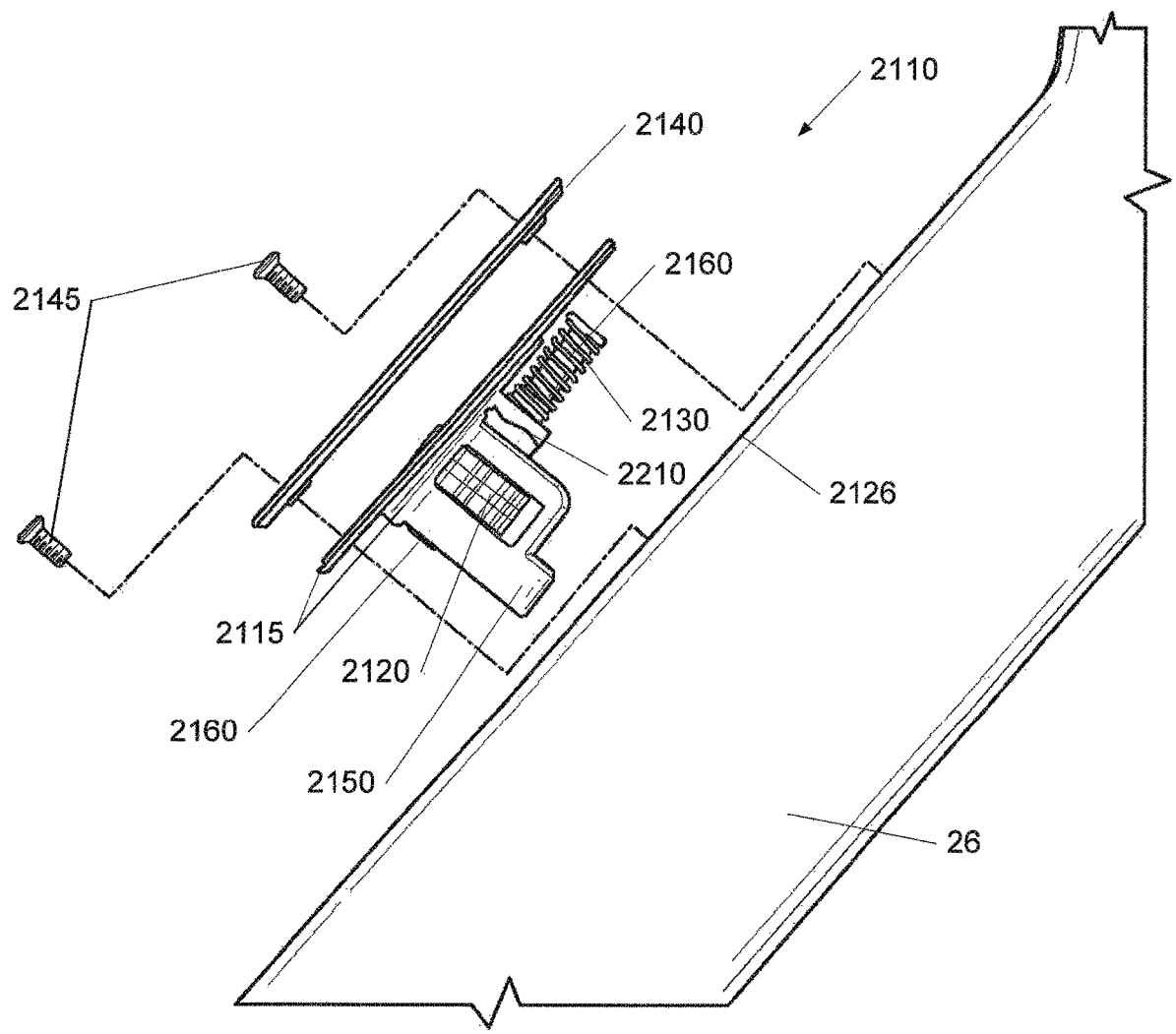
FIG. 17 is a side view of the down tube 26 the frame assembly 12 of FIG. 1 in accordance with an illustrative embodiment.
Figure 18:
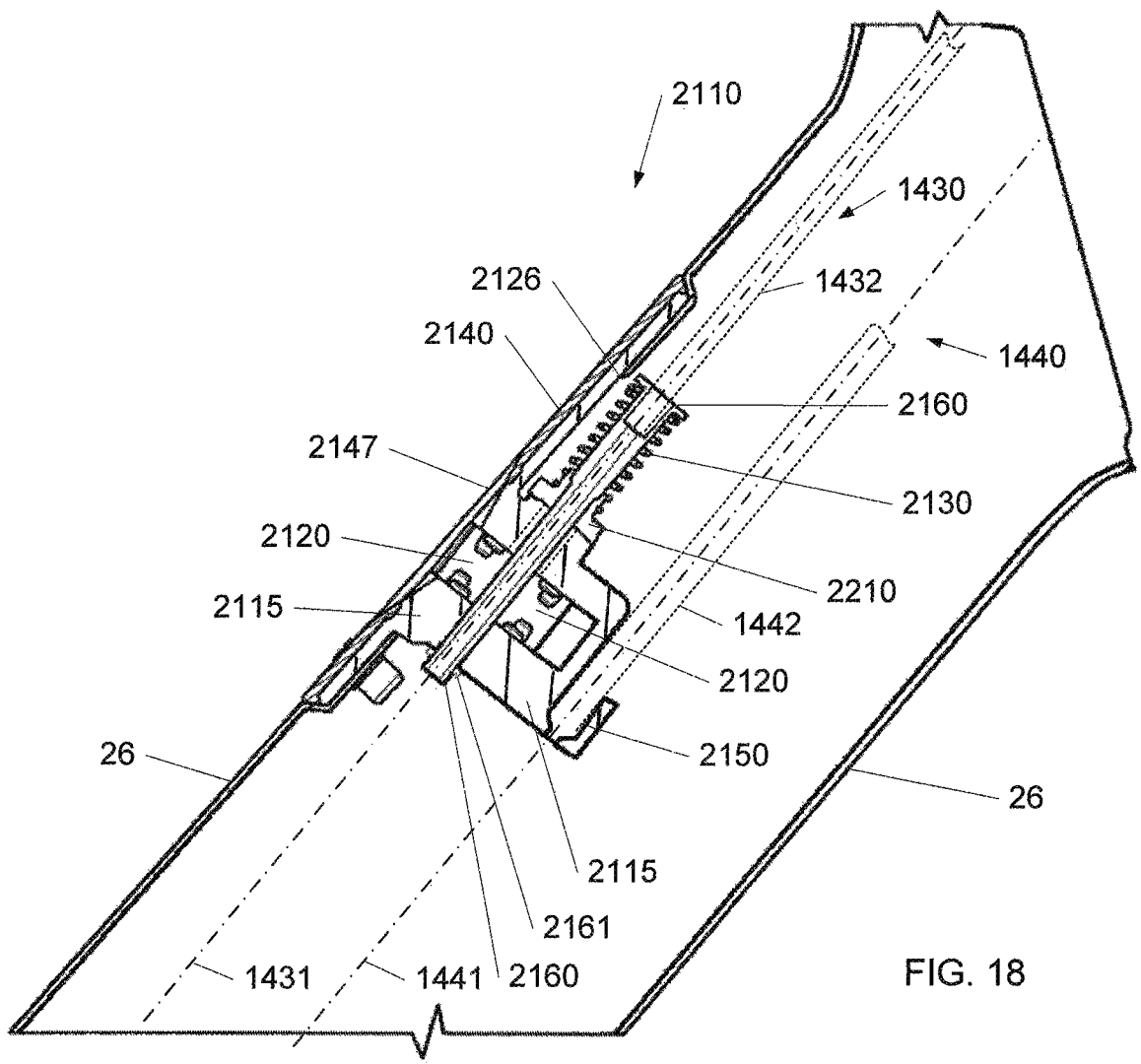
FIG. 18 is a side section view of the down tube 26 the frame assembly 12 of FIG. 1 in accordance with an illustrative embodiment.

Referring now to FIG. 16, a perspective view of the down tube 26 of the frame assembly 12 of FIG. 1 in accordance with an illustrative embodiment is shown. Referring to FIG. 17, a side view of the down tube 26 the frame assembly 12 of FIG. 1 in accordance with an illustrative embodiment is shown. Referring to FIG. 18, a side section view of the down tube 26 the frame assembly 12 of FIG. 1 in accordance with an illustrative embodiment is shown.

A barrel adjuster assembly 2110 can be located in a down tube opening 2126 of the down tube 26. The barrel adjuster assembly 2110 can included a barrel adjuster body 2115, a cover plate 2140, an adjustable cable stop 2160, a biasing spring 2130, a finger wheel 2120, a cable stop 2150, and fasteners 2145. The adjustable cable stop 2160 can be threaded into the barrel adjuster assembly 2110. The finger wheel 2120 can be attached to the adjustable cable stop 2160 such that when the finger wheel 2120 is turned, the adjustable cable stop 2160 can move towards and away from the barrel adjuster body 2115. Detents 2210 on the adjustable cable stop 2160 and the barrel adjuster body 2115 create a tactile adjustment response and lock the position of the adjustable cable stop 2160. The biasing spring 2130 is captured between the adjustable cable stop 2160 and the barrel adjuster body 2115. The adjustable cable stop 2160 can be locked to the barrel adjuster assembly 2110 by clip 2161. The cover plate 2140 can include an opening 2147 to provide access to the finger wheel 2120. The finger wheel 2120 can be accessible from the outside of the down tube 26 via the opening 2147 in cover plate 2140. The barrel adjuster assembly 2110 can be secured in the down tube opening 2126 by fasteners 2145.

Cable 1430 can be tensioned by adjustable cable stop 2160. An outer sheathing 1432 of cable 1430 can rest in a cup of adjustable cable stop 2160. The control cable 1432 of cable 1430 can pass through a passage in the adjustable cable stop 2160. When finger wheel 2120 is manipulated, the tension on control cable 1432 is changed.

Cable 1440 can be secured by cable stop 2150. An outer sheathing 1442 of cable 1440 can rest in a cup of cable stop 2150. The control cable 1442 of cable 1440 can pass through a passage in the cable stop 2150.

Advantageously, tensioning and stability of the internal cabling can be accomplished with internal components.

Therefore, one embodiment of the invention includes a bicycle frame assembly having a forward frame triangle that includes a top tube and a bottom tube. The top tube includes a first end that is connected to a head tube and a second end. The bottom tube includes a first end that is connected to the head tube and a second end. A bottom bracket is connected to the second end of the bottom tube. A seat tube extends in an upward direction from the bottom bracket. A pair of seat stays are connected to the top tube and extend in a rearward direction beyond the forward frame triangle. A pivot connects the seat tube to the forward frame triangle proximate the top tube at a location nearer a bicycle seat than the bottom bracket.

Another embodiment of the invention that includes one or more features combinable with the above embodiment includes a bicycle frame assembly having an upper frame member that includes a top tube and a pair of seat stays. The upper frame member extends between a dropout associated with a rear wheel and a head tube. An opening is formed in the upper frame member. A lower frame member includes a bottom tube, a bottom bracket, and a chain stay extends between the dropout and the head tube. A seat tube extends from the lower frame member toward the upper frame member and passes through the opening in the upper frame member. A pivot connects the seat tube to the upper frame member proximate the opening so that more of the seat tube is located between the pivot and the bottom bracket than extends beyond the upper frame member.

Another embodiment of the invention that is useable with one or more of the aspects of the above embodiments discloses a method of allowing deflection of a seat tube. A seat tube is connected to a bottom bracket. The seat tube is connected to an upper frame member with a pivot that is located at an overlapping intersection of the seat tube and the upper frame member so that the seat tube can deflect from alignment along a line between the bottom bracket and the pivot.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A bicycle, comprising:
   a frame including a top tube and a head tube;
   a fork including a steer tube, wherein the steer tube comprises at least one routing feature selected from a flat face and a cable tray;
   handlebars;
   at least one spacer positioned between the head tube and the handlebars, wherein the at least one spacer includes a right portion and a left portion that is detachable from the right portion; and
   an internal cable;
   wherein:
      the internal cable is routed at least partially inside the handlebars to the steer tube; and
      the internal cable is routed between the routing feature of the steer tube and the spacer.

2. The bicycle of claim 1, wherein the right portion is mechanically fixed to the left portion.

3. The bicycle of claim 1, wherein the right portion includes at least a pair of right connecting mechanisms and the left portion includes at least a pair of left connecting mechanisms configured to couple to the pair of right connecting mechanisms.

4. The bicycle of claim 1, wherein the at least one spacer includes a cable exit configured to direct the internal cable into the top tube.

5. The bicycle of claim 1, wherein the handlebars are made of a fiber reinforced plastic.

6. The bicycle of claim 1, wherein the internal cable is further routed through a cable exit of the at least one spacer and into the top tube at a cable entry.

7. The bicycle of claim 1, wherein the internal cable is further routed through a bushing that surrounds the steer tube and into the head tube.

8. The bicycle of claim 7, further comprising a front brake assembly coupled to the fork; wherein the internal cable is coupled to the front brake assembly.

9. The bicycle of claim 8, further comprising brake doors located in a bottom of the head tube and configured to open as the front brake assembly is rotated with the fork.

10. The bicycle of claim 1, further comprising a barrel adjuster assembly located within a down tube of the frame; wherein a finger wheel of the barrel adjuster assembly is configured to tension the internal cable, and the finger wheel is accessible from the outside of the down tube.

* * * * *